(12) United States Patent
Hattori

(10) Patent No.: US 9,378,301 B2
(45) Date of Patent: Jun. 28, 2016

(54) APPARATUS, METHOD, AND COMPUTER PROGRAM PRODUCT FOR SEARCHING STRUCTURED DOCUMENT

(75) Inventor: Masakazu Hattori, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1136 days.

(21) Appl. No.: 12/503,439

(22) Filed: Jul. 15, 2009

(65) Prior Publication Data

US 2010/0082587 A1    Apr. 1, 2010

(30) Foreign Application Priority Data

Sep. 26, 2008   (JP) .................................. 2008-247998

(51) Int. Cl.
 *G06F 17/30* (2006.01)
 *G06F 17/27* (2006.01)
 *G06F 17/22* (2006.01)

(52) U.S. Cl.
 CPC ...... *G06F 17/30911* (2013.01); *G06F 17/2247* (2013.01); *G06F 17/2258* (2013.01); *G06F 17/272* (2013.01); *G06F 17/30935* (2013.01); *G06F 17/30938* (2013.01)

(58) Field of Classification Search
 CPC   G06F 17/272; G06F 17/2247; G06F 17/2258
 USPC ........................................................ 707/755
 See application file for complete search history.

(56) References Cited

U.S. PATENT DOCUMENTS

| | | | | |
|---|---|---|---|---|
| 5,530,852 | A * | 6/1996 | Meske et al. | 709/206 |
| 5,685,003 | A * | 11/1997 | Peltonen et al. | 715/202 |
| 7,398,201 | B2 * | 7/2008 | Marchisio et al. | 704/9 |
| 7,725,817 | B2 * | 5/2010 | Krasun et al. | 715/236 |
| 7,917,480 | B2 * | 3/2011 | Dean et al. | 707/693 |
| 2003/0233224 | A1 * | 12/2003 | Marchisio et al. | 704/4 |
| 2004/0111396 | A1 * | 6/2004 | Musayev | G06F 17/30908 |

(Continued)

FOREIGN PATENT DOCUMENTS

| | | |
|---|---|---|
| JP | 2000-057163 | 2/2000 |
| JP | 2001-034618 | 2/2001 |

(Continued)

OTHER PUBLICATIONS

Diao, et al. YFilter: Efficient and Scalable Filtering of XML Documents. IEEE Proceedings of the 18th International Conference on Data Engineering 2002.

(Continued)

*Primary Examiner* — James Trujillo
(74) *Attorney, Agent, or Firm* — Amin, Turocy & Watson, LLP

(57) ABSTRACT

A structured document searching apparatus that stores structured document data each including hierarchized elements stores a data stream in which the elements included in the structured document data are arranged in the order of the syntactic analysis result, and stores while at least one index stream in which the elements included in the structured document data and serving as an index in a structured document data search are arranged in the order of the syntactic analysis. The structured document searching apparatus creates a scanning plan that instructs the scanning of the data stream and the index stream, based on a search criterion for the structured document data search, and executes the scanning of at least either one of the data stream and the index stream instructed by the scanning plan.

12 Claims, 16 Drawing Sheets

(56) References Cited

U.S. PATENT DOCUMENTS

| | | | | |
|---|---|---|---|---|
| 2004/0268244 | A1* | 12/2004 | Levanoni | G06F 17/30902 715/210 |
| 2007/0136340 | A1* | 6/2007 | Radulovich | 707/101 |
| 2007/0198559 | A1 | 8/2007 | Hattori | |
| 2007/0220023 | A1* | 9/2007 | Dean et al. | 707/101 |

FOREIGN PATENT DOCUMENTS

| | | |
|---|---|---|
| JP | 2006-099427 | 4/2006 |
| JP | 2007-226452 | 9/2007 |

OTHER PUBLICATIONS

Avila-Campillo, et al. XMLTK: An XML Toolkit for Scalable XML Stream Processing.

Japanese Office Action for Application No. 2008-247998 Mailed Jan. 11, 2011.

Masakazu Hattori, "Implementation of structure coding based lightweight XML database", Journal of the DBSJ, Database Society of Japan, Jun. 27, 2008, vol. 7, No. 1, pp. 215-220.

\* cited by examiner

FIG.4

DOCUMENT 1

```
E1  <publication>
E2  <title>XML Database</title>         E3
E4  <author>Hattori, ...</author>
E6  <author>Tanaka, ...</author>        E5
E8  <body>                              E7
E9  Conventional XML databases are...
    </body>
    <publication date>2007/03/02</publication date>
E10 ...                                 E11
    </publication>
```

FIG.5

DOCUMENT 2

```
<book>
  <title>
    Transaction Control Technology
  </title>
  <author>Suzuki, ...</author>
  <author>Sato, ...</author>
  <author>Tanaka, ...</author>
  <body>
    The fundamental function of a database...
  </body>
  ...
</book>
```

DOCUMENT 3

```
<publication>
  <title>
    XML Application Development
    -Java Programming-
  </title>
  <author>Suzuki, ...</author>
  <author>Hattori, ...</author>
  <details>
    According to this book, both XML and Java...
  </details>
  ...
</publication>
```

| E0 | E1 | E2 | E3 | E4 | E5 | E6 | E7 | E8 | E9 | E10 | E11 |
|---|---|---|---|---|---|---|---|---|---|---|---|
| (G)0 | 1 | 2 | 3 | 4 | 5 | 6 | 7 | 8 | 9 | 10 | 11 |

SETTING INFORMATION

./title: IndexStream[1]
./author: IndexStream[2]

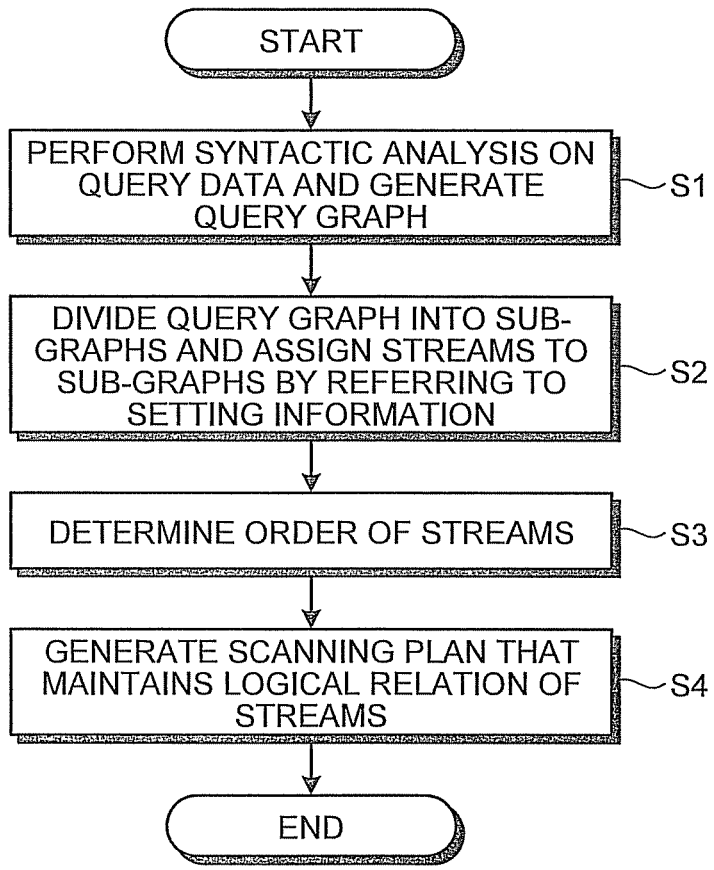

QUERY DATA 2

```
for $x in //book
where contains($x/title, "XML") and
      contains($x/author, "Hattori")
return $x
```

SCANNING PLAN 2

QUERY DATA 3

```
for $x in //publication
where contains($x/title, "XML") or
      contains($x/author, "Hattori")
return $x
```

SCANNING PLAN 3

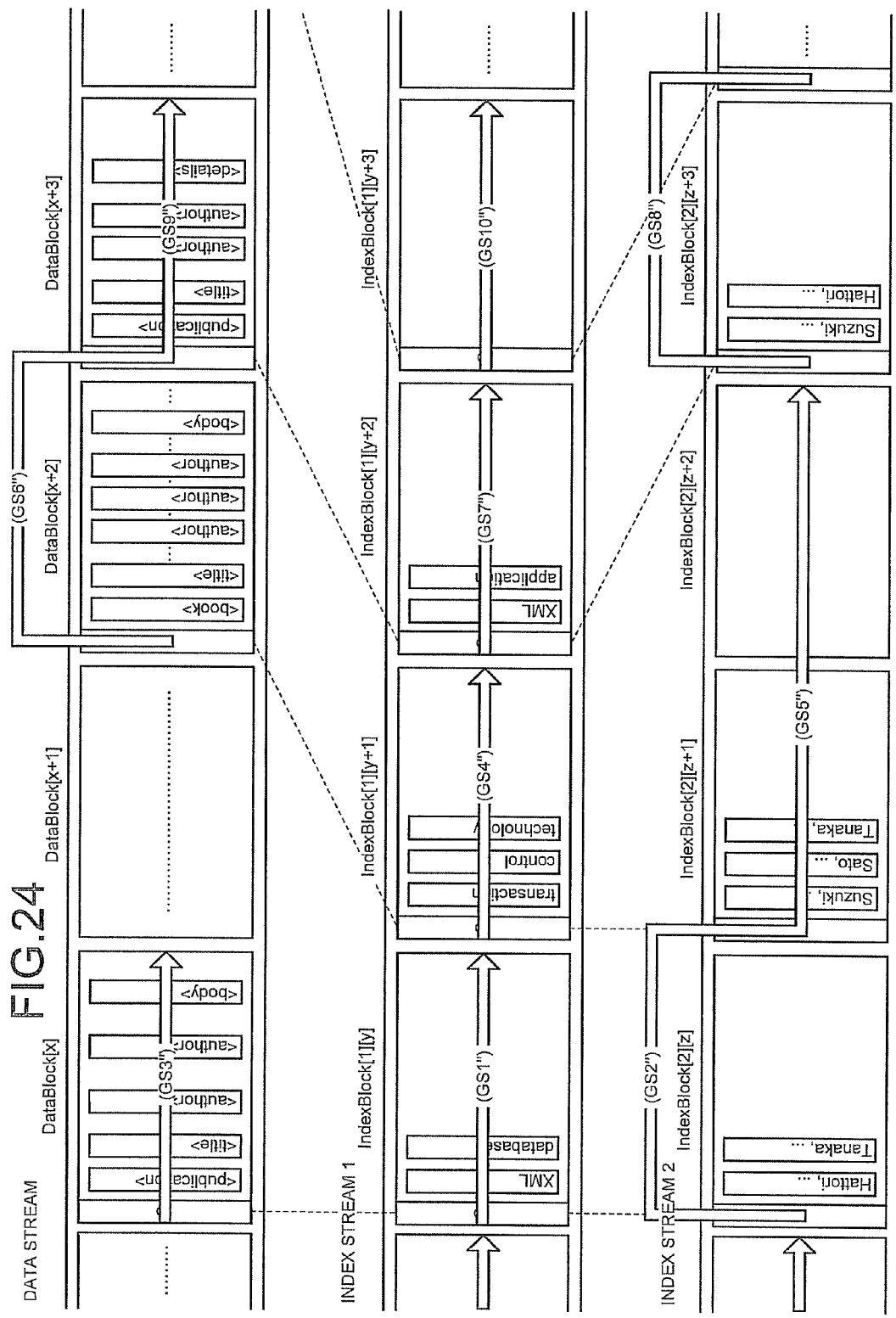

APPARATUS, METHOD, AND COMPUTER PROGRAM PRODUCT FOR SEARCHING STRUCTURED DOCUMENT

CROSS-REFERENCE TO RELATED APPLICATIONS

This application is based upon and claims the benefit of priority from the prior Japanese Patent Application No. 2008-247998, filed on Sep. 26, 2008; the entire contents of which are incorporated herein by reference.

BACKGROUND OF THE INVENTION

1. Field of the Invention

The present invention relates to a structured document searching apparatus that stores structured document data including hierarchized elements and searches through the structured document data in accordance with search criteria, as well as a method and a computer program product therefor.

2. Description of the Related Art

Several systems have been suggested for structured document management by which structured document data described in the Extensible Markup Language (XML) or the like is stored and searched. A system of the first type manages the structured document data as text files without making any changes. With this system, the data storing efficiency is decreased in accordance with an increase in the number of data items and the size of the data. In addition, with this system, a search that takes full advantage of the structured documents becomes difficult. A system of the second type stores and manages the structured document data in a RDB (relational database). This system is widely used in backbone systems. A system of the third type adopts an object-oriented database (OODB), which has been developed for structured document data management. The database of this system adopts an extended RDB, such as a XML-compliant RDB. Because the data is stored in the RDB in the form of a flat table, complex mapping is required to associate the hierarchical structure of the XML data of the like with the table. Due to this mapping, the performance would be lowered without a preliminarily well-designed structure (schema) of the table. Recently, an alternative to the above three systems has been suggested. The system of the fourth type performs native structured document data management. In accordance with this system, the XML data of various hierarchical structures is stored without any particular mapping, and thus overhead is reduced at the time of data storing or retrieving. Furthermore, costly preliminary schema designing becomes unnecessary, and the XML data structure can be freely modified in accordance with changes in the business environment.

Even when the structured document data is efficiently stored, there is no point without a means for retrieving the stored data. A query language offers a data retrieving means. In the field of RDB, it is the Structured Query Language (SQL). In the same manner, in the field of XML, the XML Query Language (XQuery) has been developed. The XQuery is a language with which the XML data is dealt with as a database. The language offers a means for retrieving a set of data items that match a criterion and compiling and analyzing the data. In addition, because the XML data has a hierarchical structure in which parent-child and sibling elements are arranged, a means for tracing in this structure is also offered. Reference documents that disclose a technology of searching for structured document data that contains specific elements and a specific structure that are designated by search criteria from the stored structured document data by tracing elements in the hierarchical structure include JP-A 2001-034618 (KOKAI) and JP-A 2000-057163 (KOKAI).

There is a problem in the XML data, however, that the hierarchical structure of the data containing parent-child and sibling elements lowers the storage efficiency. Furthermore, as the structured document data has a larger structure, as the number of structured document data items stored in the database increases, or as the search criteria become more complex, it takes longer to perform the process of tracing the elements that constitute the hierarchical structure of the structured document data. In addition, as the number of structured document data items or the size of the data increases, it becomes more difficult to expand the stored structured document data on the memory, and thus in most cases the data has to be stored in a secondary memory such as a hard disk. Especially in a system of the native structured document data management, the structured document data is stored with its hierarchical structure of the elements as it is. For this reason, when checking whether an element or structure designated as a search criterion is present, accesses have to be frequently made to search among the elements of the structured document data stored in the secondary memory. The frequency of the accesses would further increase if the search criteria become more complex. With a means of tracing the hierarchical structure as disclosed in JP-A 2001-034618 (KOKAI) and JP-A 2000-057163 (KOKAI), a structured document data item that contains an element or a structure designated by the search criteria is searched for by tracing the element data of the hierarchical structure of each structured document data item in the database. This prevents the search from being performed at high speed. Especially when the size of the structured document data or the number of search target structured document data items is large, or when the query data (search criteria) is complex, the high-speed search process becomes difficult. This is explained in more detail below.

(1) With a complex XQuery, multiple path patterns are included in the query. When checking the multiple path patterns, traverses to the same structured document data item are repeatedly generated. Especially when dealing with the data of a size that cannot be expanded on the memory, disk input/output to and from the same page intermittently occurs, and the performance is significantly deteriorated.

(2) With a XPath, which is a subset of the XQuery, the performance is lowered when the hit rate is high. If traverses occur to a large portion of the structure text set, a great amount of disk input/output is caused.

As a technique of reducing the scanning of the same structured document data item, a structured document stream process has been developed. For example, Y. Diao, P. Fischer, and M. J. Franklin, YFilter: Efficient and Scalable Filtering of XML Documents, in the 18th International Conference of Data Engineering, San Jose, February 2002; and I. Avila-Campillo, D. Raven, T. Green, A. Gupta, Y. Kadiyska, M. Onizuka, and D. Suciu, An XML Toolkit for Light-weight XML Stream Processing, 2002, disclose such a technique. According to these reference documents, a query such as an XPath is processed, without storing the entire structured document data in the main memory. A system of processing a query by performing a state transition onto multiple pass patterns that appear in multiple XPaths is also suggested. In reality, however, the following problems arise.

(3) With an XPath that is not hit at high rate, the performance is deteriorated. Because of its backtracking algorithm, overhead is increased in the CPU processing. Due to the characteristics of the processing, an index-adopted query is difficult to process.

As discussed above, it is difficult to process multiple pass patterns in a database that holds the structured document data with the minimum disk input/output and by a small amount of calculation. A technology developed in light of the above problems is disclosed in JP-A 2007-226452 (KOKAI). With this technology, the syntax of the structured document data is analyzed, and structural information included in the structured document data is stored by converting it to structure stream data that is one-dimensional array data by use of the structure guide data. In this manner, the structured document data can be compressed to about 1/20 the size of the original, and thereby the disk input/output can be largely reduced. This increases the storage efficiency of the database. The technology of JP-A 2007-226452 (KOKAI) does not use backtracking but repeats fundamental definitive operations, which means that overhead is reduced in the CPU processing. As a result, the search process using query data such as complex XQuery and multiple XPaths, which has been difficult to speed up, can be performed at dramatically enhanced speed. With the technology of JP-A 2007-226452 (KOKAI), the structural data and text data are perpetuated under a concept of streams, while maintaining the order of elements. The order of the structural data can be easily compressed and encoded, and therefore higher speed and lighter weight are expected.

To process the XQuery at high speed, the scanning range of the text index and the XML data should be narrowed down as much as possible by use of text conditions and structural conditions. However, with an in-line relay such as in JP-A 2007-226452 (KOKAI), it is difficult to narrow down the scanning range of the text index by use of a structural condition, and therefore all the text indexes related to a text condition need to be scanned. This may increase the disk input/output cost. In addition, when the hit rate is high with the text index, the intermediate data of a large size needs to be held, which may increase the memory cost.

SUMMARY OF THE INVENTION

According to one aspect of the present invention, a structured document searching apparatus that stores a plurality of structured document data each including a plurality of elements that are hierarchized, the apparatus includes a first store unit that stores a data stream in which the elements included in each of the structured document data are arranged in an order of a result of a syntactic analysis; a second store unit that stores at least one index stream in which the elements that are included in the structured document data and serve as an index when searching the structured document data are arranged in the order of the result of the syntactic analysis; a creating unit that creates a scanning plan that instructs a scanning of the data stream and the index stream based on a search criterion for searching through the structured document data; and an executing unit that executes a scanning on at least one of the data stream and the index stream in accordance with the scanning plan.

According to another aspect of the present invention, a structured document searching method executed by a structured document searching apparatus that stores a plurality of structured document data each including a plurality of elements that are hierarchized, the method includes storing a data stream in which the elements included in each of the structured document data are arranged in an order of a result of a syntactic analysis; storing at least one index stream in which the elements that are included in the structured document data and serve as an index when searching the structured document data are arranged in the order of the result of the syntactic analysis; creating a scanning plan that instructs scanning of the data stream and the index stream based on a search criterion for searching through the structured document data; and executing a scanning of at least one of the data stream and the index stream in accordance with the scanning plan.

A computer program product according to still another aspect of the present invention causes a computer to perform the method according to the present invention.

BRIEF DESCRIPTION OF THE DRAWINGS

FIG. 4 is a diagram for showing an example of structured document data stored in a structured document database according to the embodiment;

FIG. 5 is a diagram for showing another example of the structured document data stored in the structured document database 13 according to the embodiment;

FIG. 12 is a diagram for showing an example of query data according to the embodiment;

FIG. 13 is a flowchart of the procedure of a process in which the server according to the embodiment creates a scanning plan;

FIG. 24 is a diagram of an image of a process in which the server executes the scanning plan of FIG. 23.

DETAILED DESCRIPTION OF THE INVENTION

Exemplary embodiments of the structured document searching apparatus, method, and computer program product according to the present invention are explained below with reference to the attached drawings.

Figure 1:
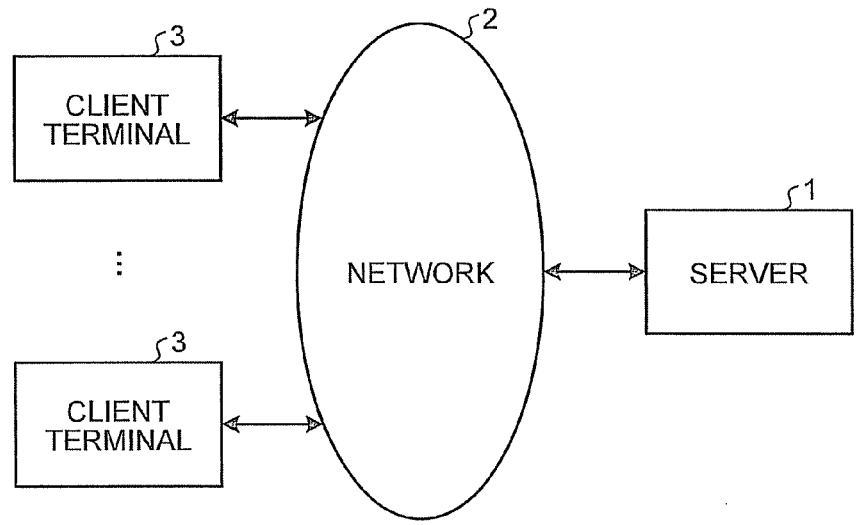
FIG. 1 is a diagram for showing the structure of a structured document management system according to an embodiment of the present invention.

In FIG. 1, a structured document management system according to an embodiment is a server/client system, in which to multiple client computers (hereinafter, "client terminals") 3, which function as structured document input/output devices, are connected to a server computer (hereinafter, "server") 1, which functions as a structured document searching apparatus by way of a network 2 such as a local area network (LAN).

Figure 2:
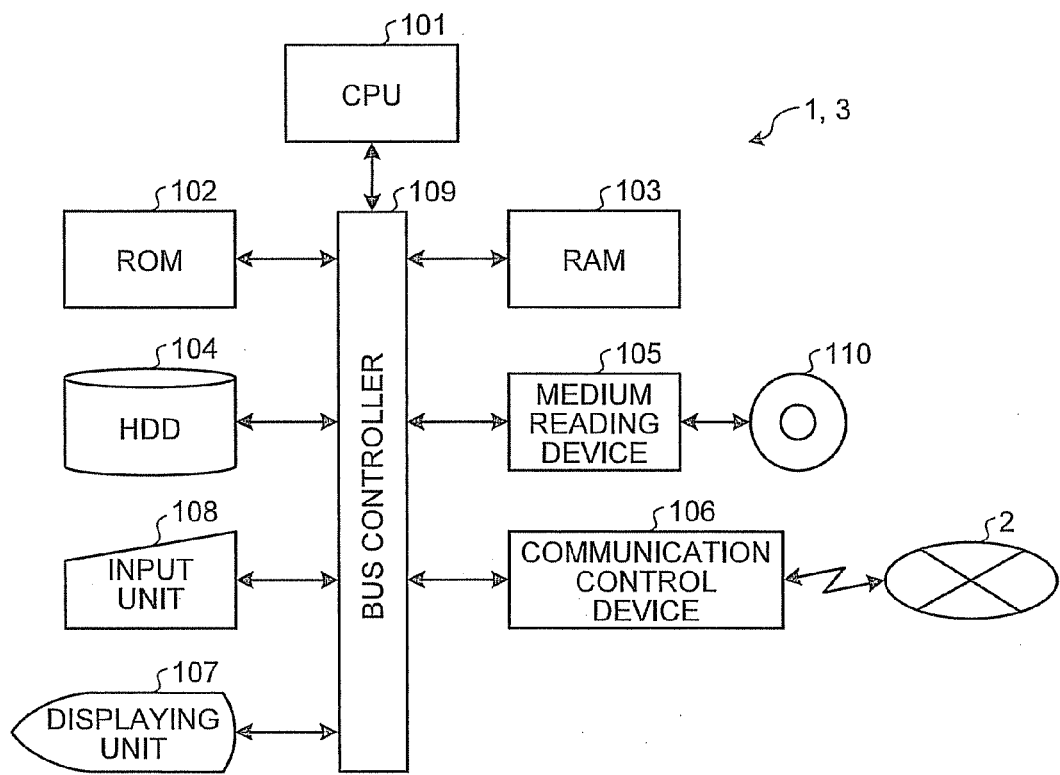
FIG. 2 is a diagram for showing the hardware structure of a server and a client terminal according to the embodiment.

In FIG. 2, hardware structures of a server 1 and the client terminals 3 are the same as that of a regular personal computer. The server 1 and each of the client terminals 3 include: a central processing unit (CPU) 101 that executes information processing; a read-only memory (ROM) 102 that stores therein a BIOS and the like; a random-access memory (RAM) 103 that stores therein various kinds of data in a rewritable manner; a hard disk drive (HDD) 104 that serves as different types of databases and also stores therein various programs; a medium reading device 105 such as a CD-ROM drive that records information in a recording medium 110, and distributes information to the outside and acquires information from the outside by use of the recording medium 110; a communication control device 106 that conveys information to an external computer through communications via a network 2; a displaying unit 107 such as a cathode ray tube (CRT) and a liquid crystal display (LCD) that presents the progress and results of the process to the user; an input unit 108 such as a keyboard and a mouse with which the user inputs a command and information to the CPU 101; and the like. The data exchanged among those units is adjusted by a bus controller 109.

When the user turns on the server 1 or the client terminal 3 of the above structure, the CPU 101 starts up a program called a loader stored in the ROM 102. Then, the CPU 101 reads a program called an operating system (OS), which manages the hardware and software of the computer, from the HDD 104 into the RAM 103, and starts up the OS. The OS starts a program, and reads and stores information, in response to the user's operation. Among various OS's, Windows (registered trademark) and UNIX (registered trademark) are well known. An operation programs that runs on the OS is called an application program. The application program is not limited to the one that runs on a certain OS, but execution of various processes that are discussed later may be partially offloaded to the OS. The program may be included as part of a program file group that forms a certain application software program or the OS.

The server 1 stores a structured document management program as an application program in the HDD 104. In this sense, the HDD 104 functions as a recording medium that holds the structured document management program. On the other hand, the client terminal 3 stores a structured document input/output program as an application program in the HDD 104. In this sense, the HDD 104 functions as a recording medium that holds the structured document input/output program.

In general, an application program to be installed in the HDD 104 of the server 1 or the client terminal 3 is recorded in any of the recording media 110 of different systems, such as optical disks including a CD-ROM and a DVD, magneto-optical disks, magnetic disks including a flexible disk, and a semiconductor memory, and the operation program recorded in the recording medium 110 is installed in the HDD 104. From this respect, any recording medium 110 that has a portability, for example, an optical information recording medium such as a CD-ROM and a magnetic medium such as a flexible disk, also functions as a recording medium that holds an application program. Furthermore, the application program may be externally captured by way of the communication control device 106 and installed in the HDD 104.

In the server 1, when the structured document management program that runs on the OS is started, the CPU 101 executes different calculations, centrally controls the units, and realizes different functions in accordance with the structured document management program. On the other hand, in the client terminal 3, when the structured document input/output program that runs on the OS is started, the CPU 101 executes different calculations, centrally controls the units, and realizes different functions in accordance with the structured document input/output program.

Figure 3:
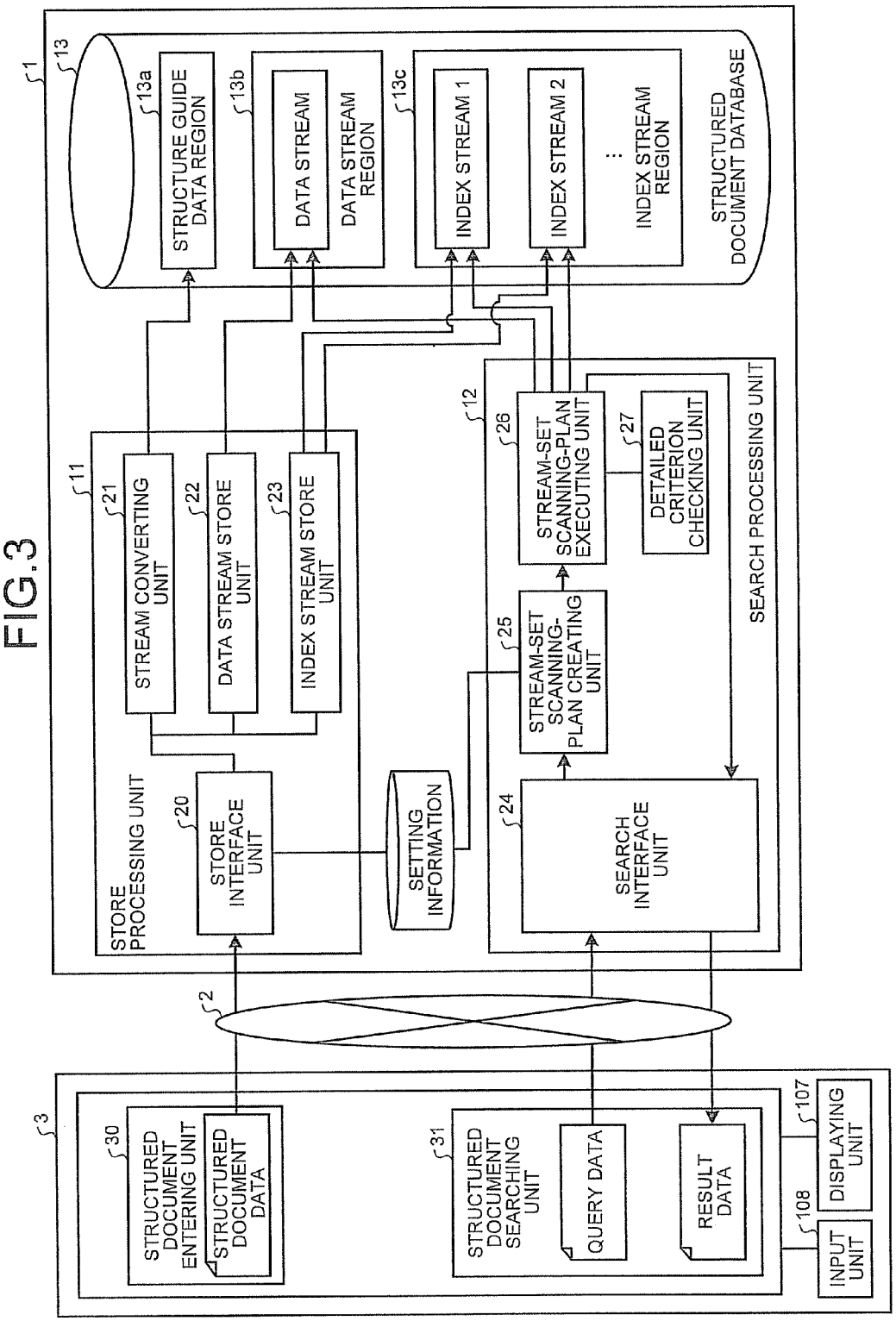
FIG. 3 is a diagram for showing an example of the functional structures of the server and the client terminal according to the embodiment.

The functions realized in the client terminal 3 are now explained. FIG. 3 is a diagram for showing an example of the functional structures of the server 1 and the client terminal 3. The client terminal 3 includes a structured document entering unit 30 and a structured document searching unit 31. The structured document entering unit 30 enters the structured document data input by the input unit 108 and the structured document data already stored in the HDD 104 of the client terminal 3, in the structured document database 13 of the server 1, which will be discussed later. The structured document entering unit 30 transmits an entry request to the server 1, together with the structured document data that is to be entered. In accordance with an instruction input by the user from the input unit 108, the structured document searching unit 31 creates query data, which describes search criteria for searching for a certain structured document data item from among the structured document data stored in the structured document database 13, and sends the query data as a search request to the server 1. The structured document searching unit 31 also receives the resultant data from the server 1 in response to the search request, and displays it on the displaying unit 107.

Figures 6, 7:
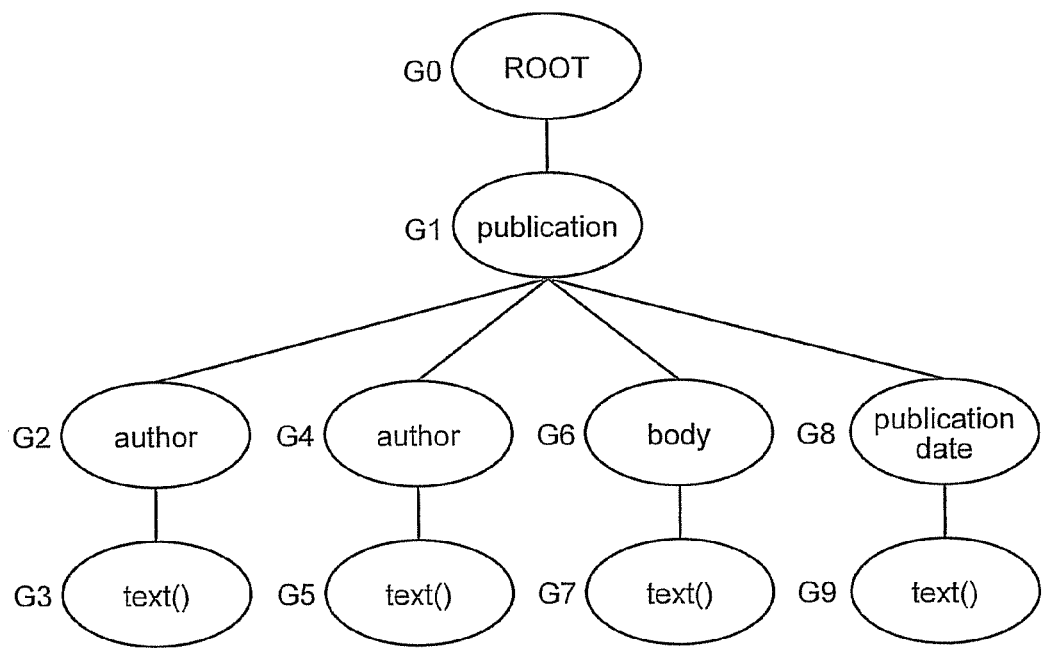
FIG. 6 is a diagram for showing still another example of the structured document data stored in the structured document database according to the embodiment.
FIG. 7 is a conceptual diagram for showing an example of structure guide data according to the embodiment.

The functions realized in the server 1 are explained below with reference to FIG. 3. The server 1 includes a store processing unit 11, a search processing unit 12, and the structured document database 13. The structured document database 13 is generated, for example, in the HDD 104 to the structured document data. FIGS. 4 to 6 are diagrams for showing examples of the structured document data stored in the structured document database 13.

The Extensible Markup Language (XML) is a typical language that is used to describe the structured document data. The structured document data indicated in FIGS. 4 to 6 is described in the XML. Individual parts contained in the document structure are called elements in the XML, and each element is described with tags. More specifically, each element is expressed with a tag indicating the beginning of the element (beginning tag) and a tag indicating the end of the element (end tag) and is sandwiched between these tags. The text data sandwiched by the beginning tag and the end tag is a text element (text node) that is included in an element defined by the beginning tag and the end tag. A pair of a beginning tag and an end tag that sandwich the text element is called a structural element. A document 1 in FIG. 4 contains a root element of elements between tags <publication>. The structural element "publication" contains sub-elements, which are also structural elements, sandwiched by pairs of tags <title>, <author>, <text>, and the like. Between the tags <title>, there is a text element "XML database". There are two structural elements of <author>. The first structural element <author> has a text element "Hattori, . . . " as a sub-element, and the second structural element <author> has a text element "Tanaka, . . . " as a sub-element. A document 2 in FIG. 5 contains a root element of elements defined by tags <book>. In a similar manner, a document 3 in FIG. 6 contains a root element of elements defined by the tags <publication>.

The structured document database 13 is provided with a structure guide data region 13*a*, a data stream region 13*b*, and an index stream region 13*c*. The structure guide data region 13*a* stores therein the structure guide data. The structure guide data indicates the summary of the hierarchical structure of the entire structured document data set stored in the structured document database 13. The data stream region 13*b* stores therein data streams generated from the structured document data in accordance with the structure guide data. The index stream region 13*c* stores therein index streams that serve as an index in a structured document data search. The structure guide data, the data streams, and the index streams will be discussed in detail later.

The store processing unit 11 receives the entry request from the client terminal 3, and stores the structured document data transmitted by the client terminal 3 in the structured document database 13. The store processing unit 11 includes a store interface unit 20, a stream converting unit 21, a data stream store unit 22, and an index stream store unit 23. The store interface unit 20 analyzes the syntax of the structured document data transmitted by the client terminal 3, and then calls up the stream converting unit 21 to generate data streams and index streams.

By referring to and updating the structure guide data stored in the structure guide data region 13*a* of the structured document database 13 regarding the structured document data that has been subjected to the syntactic analysis by the store interface unit 20, the stream converting unit 21 converts the hierarchical structure information included in this structured document data to data streams. In other words, the stream converting unit 21 generates a data stream by aligning structural elements and text elements in chronological order. These elements are obtained as a result of the syntactic analysis of the structured document data. The chronological order of the elements means the order of results obtained when traversing the structured document from the root element, or in other words, the order of results of the syntactic analysis. In particular, it means the order of the elements of the structured document data from a parent element to a child element and from a preceding element to a following element.

The method with which the stream converting unit 21 generates a data stream is summarized below. First, the structure guide data that is used for the generation is explained. The structure guide data has a hierarchical structure and satisfies the following conditions:

(a) All the paths that appear in the structured document data set stored in the system appear in the structure guide data;

(b) All the paths in the structure guide data appear in the structured document data set stored in the system; and (c) All the paths in the structure guide data are unique.

FIG. 7 depicts a conceptual diagram of an example of the structure guide data. The structure guide data is generated as a result of the syntactic analysis of the structured document data in FIG. 4. The structure guide data has a hierarchical structure of guide nodes and arcs. A tag name is written in each guide node. An embedded tag name "text( )" is described for the text element. A tag name "ROOT" is given to the guide node of a root. A unique ID (GID) is assigned to each guide node, and IDs G0 to G9 are used here. Each time a new item of the structured document data is entered into the structured document database 13, the structure guide data is increasingly updated with a new guide node set added to the structure guide data region 13*a* of the structured document database 13.

A data stream is an array of GIDs arranged in correspondence with the text nodes that are passed when tracing the structured document data from the root in the depth-first order. Such arranged elements are called array elements.

Figures 8, 9:
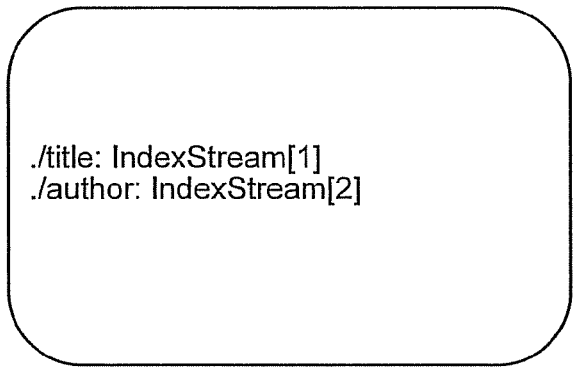
FIG. 8 is a conceptual diagram of a data stream according to the embodiment.
FIG. 9 is a diagram for showing an example of setting information according to the embodiment.

FIG. 8 is a conceptual diagram for showing an example of the data stream. This example shows the structured document data of FIG. 4 converted to an array of GIDs in accordance with the structure guide data of FIG. 7. Each array element is converted into numeral form using GIDs.

E0 Array element corresponding to "ROOT": (G)0
E1 Array element corresponding to "publication": (G)1
E2 Array element corresponding to "author": (G)2 . . .

By arranging the elements and generating the data stream in this manner, the stream converting unit 21 converts the structured document data of a two-dimensional structure to the data stream of one-dimensional array data.

The method with which the stream converting unit 21 updates the structure guide data is explained below. When receiving from the client terminal 3 the structured document data that is to be newly stored and the entry request including the GID of a folder into which this structured document data is to be stored, the stream converting unit 21 performs the syntactic analysis on the structured document data. It is assumed here that the client terminal 3 has made an inquiry to the server 1 in advance and already obtained the GID of the target folder. As a result of the analysis, the stream converting unit 21 obtains a hierarchical structure including object data items of the structured document data, and expands it on a memory such as the RAM 103. If the structured document data is in the XML format, the data is expanded to object data of the Document Object Model (DOM). The stream converting unit 21 extracts the structure of the structured document data, or in other words, nodes corresponding to the elements of the structured document data and a structure (Sc) including these nodes, by tracing the analysis result from the root. The stream converting unit 21 scans the structure guide data region 13*a* by using the GID (GIDP) of the target folder as a key to obtain a corresponding structure (Sp). Thereafter, the stream converting unit 21 compares the Sc with the Sp, and, if there is any structural element of the Sc that corresponds to any of structural elements of the Sp, the stream converting unit 21 assigns the GID of the structural element of the Sp to the structural element of the Sc. If there is no structural element of the Sc that corresponds to any of structural elements of the Sp, the stream converting unit 21 assigns a new GID to the new element that is not contained in the Sp but in the Sc, and adds the new element to the Sp. Furthermore, the stream converting unit 21 assigns the new GID to the new element of the Sc. The stream converting unit 21 performs this operation onto all the structural elements of the Sc. Then, the stream converting unit 21 stores the updated Sp in the structure guide data region 13*a*. In this manner, the structure guide data stored in the structure guide data region 13*a* is updated. Finally, the stream converting unit 21 assigns GIDs to all the elements of the structured document data that is to be stored.

Moreover, the stream converting unit 21 converts the text elements in the structured document data subjected to the syntactic analysis by the store interface unit 20 to an index stream, based on the predetermined setting information. More specifically, the stream converting unit 21 selects, from the elements obtained as a result of the syntactic analysis of the structured document data, a set of text elements that match the setting information, arranges the elements of the set in chronological order, and thereby generates an index stream. The setting information designates text elements that are to be built into an index, and usually adopts path designation of the structured document data. FIG. 9 is a diagram for showing an example of the setting information. The setting information is a record expressed with columns using ":" as a delimiter. The first column indicates the path designation, and the second column indicates a stream number. For example, the first record specifies that a text element that is a child element of a structural element <title> immediately below the root of the structured document data (./) should be built into an index and that the index should be stored in an index stream 1. The second record specifies that a text element that is a child element of the structural element <author> immediately below the root should be built into an index and that the index should be stored into an index stream 2. The setting information may be set in an automatic manner, for example by updating it each time the structured document data is stored, or may be specified by the user in advance. The index stream contains text elements that serve as an index for each text. When text elements of different types are specified at a time, the stream converting unit 21 generates multiple index streams.

Returning to FIG. 3, the data stream store unit 22 embeds a synchronization signal SYNC in header information of the data stream generated by the stream converting unit 21 for every document, and also embeds the number of blocks, which indicates the number of texts, in the header information. Then, the data stream store unit 22 stores the data stream in the data stream region 13b. The index stream store unit 23 embeds a synchronization signal SYNC in the header information for every document of the index stream generated by the stream converting unit 21, and stores the index stream in the index stream region 13c.

Figure 10:
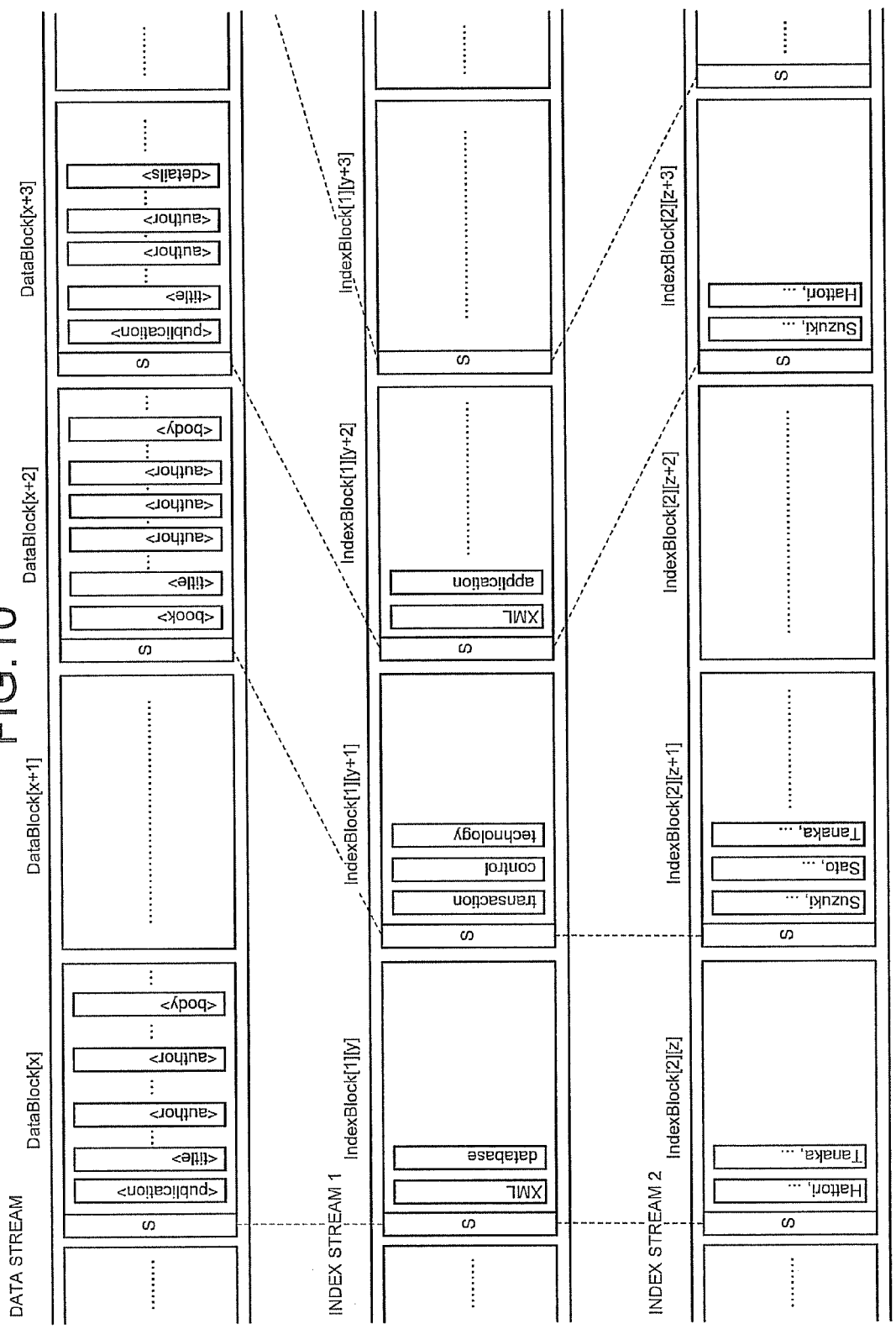
FIG. 10 is a diagram for showing an example of a data stream and index streams converted from the structured document data illustrated in FIGS. 4 to 6.

FIG. 10 is a diagram for showing examples of a data stream and index streams converted in the above manner from the structured document data in FIGS. 4 to 6. There is always only one data stream. As for the index stream, there are two, as indicated in the setting information of FIG. 9. The documents 1, 2, and 3 shown in FIGS. 4 to 6 are stored in this order. Each stream is constituted of an array of blocks having a fixed length of 128 bytes, 1024 bytes, or 4096 bytes. For the sake of simplicity, the data stream is referred to with a one-dimensional array image of DataBlock[i] (i=0, 1, 2, ... ). Because there is more than one index stream, these streams are referred to with a two-dimensional array image of IndexBlock[j] [i] (i=0, 1, 2, ... ; j=0, 1, 2, ... ; j is the number of index streams).

The document 1 is stored in DataBlock[x] and DataBlock[x+1] of the data stream. The text element that is a child element of the <title> element of the document 1 is stored in IndexBlock[1] [y] of the index stream 1. The text element that is a child element of the structural element <author> of the document 1 is stored in IndexBlock[2] [z] of the index stream 2. The document 2 is stored in DataBlock[x+2]. The text element that is a child element of the structural element <title> in the document 2 is stored in IndexBlock[1] [y+1] of the index stream 1. The text element that is a child element of the structural element <author> in the document 2 is stored in IndexBlock[2] [z+1] and IndexBlock[2] [z+2] of the index stream 2. The document 3 is stored in DataBlock[x+3] of the data stream. The text element that is a child element of the structural element <title> in the document 3 is stored in IndexBlock[1] [y+2] of the index stream 1. The text element that is a child element of the structural element <author> in the document 3 is stored in IndexBlock[2] [z+3] of the index stream 2. The header information is positioned at the beginning of each document, and a synchronization signal SYNC (S) is embedded in the header information. Data blocks can be distinguished from one another by the synchronization signal in each document. Thereafter, elements such as <publication>, <title>, <XML database>, </title>, and the like are stored in chronological order. Because one block is not large enough to store the elements, the following DataBlock[x+1] stores therein the rest of the elements. The storing process can be realized by incorporating event-based XML parser SAX (simple API for XML).

Figure 11:
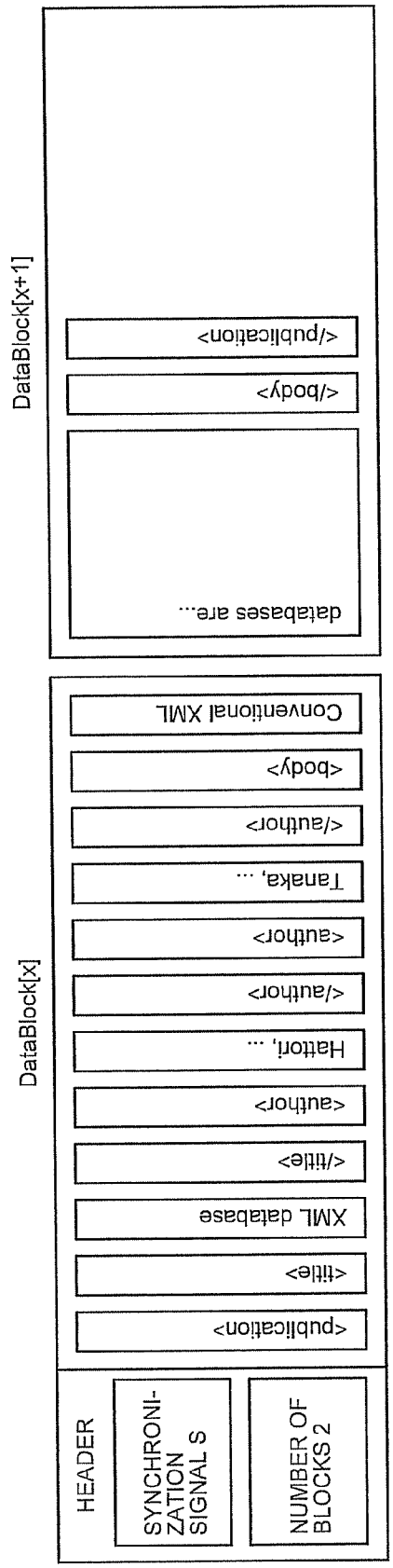
FIG. 11 is a diagram for showing DataBlock[x] and DataBlock[x+1] according to the embodiment in a concrete form.

FIG. 11 is a diagram for showing a concrete form of DataBlock[x] and DataBlock[x+1]. The header information of DataBlock[x] holds the synchronization signal SYNC and the number of blocks (2) of the document. When the data stream, the index stream 1 and the index stream 2 do not particularly have to be differentiated from one another, they are simply referred to as "stream".

Returning to FIG. 3, when receiving a search request from the client terminal 3, a search interface unit 24 performs a syntactic analysis on the query data of the search request, and calls up the stream-set scanning-plan creating unit 25 to generate a scanning plan. In the following explanation, query data described in XQuery is dealt with as an example.

The XML adopts a query language called XML Query Language (XQuery) suggested by the W3C, and the query data is described with a describing method based on this language. The XQuery can be explained with syntax patterns of FLWR (for-let-where-return). The XQuery language specifications are discussed below from the aspect of the procedure. The syntax of a for-clause takes a form "for variable in equation". The syntax of the for-clause indicates substitution of an expression that satisfies the equation to the variable and running of a loop. The syntax of a let-clause is "let variable:=equation". The syntax of the let-clause indicates aggregation of expressions that satisfy the equation and substitution of the sequence of the values to the variable. The sequence means a flat list. A where-clause restricts the loop repeated in the for-clause. The syntax of the where-clause is "where equation". The syntax of the where-clause indicates that the loop is run for an expression that satisfies the equation, while the loop is skipped for an expression that does not. A return-clause is to format the processing result of the XQuery. The syntax of the return-clause is "return equation". The syntax of the return-clause describes any XML data including a variable. The syntax of the variable is "$character string". Any variables having the same character string are regarded as the same, except for the case of double declaration due to nested queries or the like. The XQuery includes following operators that designate the criteria of a hierarchy among the XML data elements:

"/" Operator indicating a parent-child relation between elements;

"//" Operator indicating an ancestor-descendant relation between elements;

"." any element

FIG. 12 is a diagram for showing an example of the query data described in the XQuery. The query data 1 of this drawing makes the following request as a search request. The hierarchical tree structure of the structured document database "ROOT" contains a structural element <publication>, and the structural element <publication> contains a structural element <title>. In the structural element <title>, a text element "XML" appears. The structural element <publication> also contains a structural element <author>, and in the structural element <author>, a text element "Hattori" appears. A list of <publication> having such structured document data is to be returned.

In response to a call issued by the search interface unit 24, the stream-set scanning-plan creating unit 25 generates a scanning plan from the query data. The method of generating the scanning plan is explained in detail later in the section of operations.

Furthermore, the search interface unit 24 calls up a stream-set scanning-plan executing unit 26 to execute the scanning plan generated by the stream-set scanning-plan creating unit 25. Thereafter, the search interface unit 24 calls up the detailed criterion checking unit 27 to generate the final result data, and stores it in the RAM 103. Then, the search interface unit 24 transmits to the client terminal 3 the result data as a search result in response to the search request. The stream-set scanning-plan creating unit 25 generates a scanning plan as the procedure of accessing the structured document database 13 by referring to the setting information. As discussed above, the structured document database 13 includes multiple streams such as a data stream and index streams. The stream-set scanning-plan creating unit 25 generates a scanning plan that indicates the procedure of scanning these streams. The stream-set scanning-plan executing unit 26 executes the scanning plan generated by the stream-set scanning-plan creating unit 25 and generates result data. The detailed criterion checking unit 27 checks the result data based on detailed search criterion ("detailed criterion") that cannot be checked with the scanning plan generated by the stream-set scanning-plan creating unit 25 among the search criteria designated by the query data, and thereby generates the final result data and stores it in the RAM 103.

The procedure of the process executed by the server 1 according to the present embodiment is explained below. First, the procedure of the process in which the server 1 generates a scanning plan is explained with reference to FIG. 13. When receiving a search request from the client terminal 3, the search interface unit 24 analyzes the syntax of the query data that is the search request, and then calls up the stream-set scanning-plan creating unit 25 to generate a scanning plan. The stream-set scanning-plan creating unit 25 first generates a query graph from the query data (Step S1). The query graph can be generated by expressing the relations between tags in tree form. The query graph from the query data described in the XQuery can be mechanically generated by use of a syntactic analyzing tool such as Yet Another Compiler-Compiler (Yacc). The query graph generating operation can be performed in a path pattern compiling process and an analogous process as described in JP-A 2007-226452 (KOKAI), for example.

Figure 14:
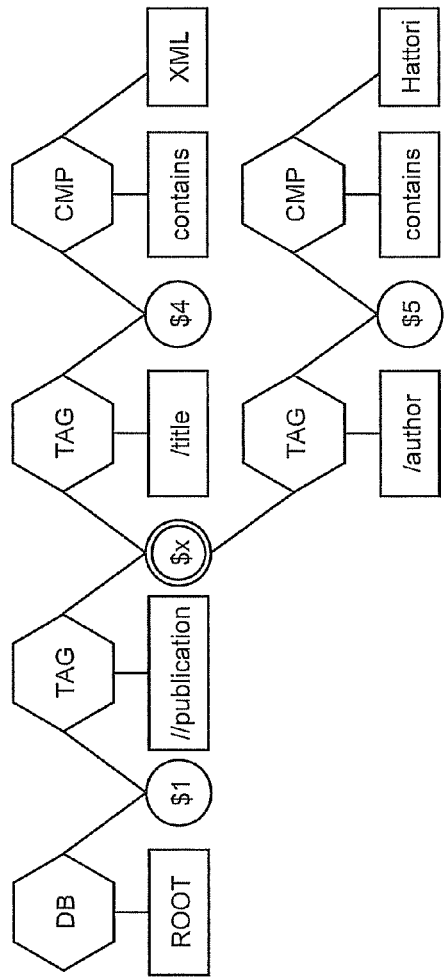
FIG. 14 is a schematic diagram of a query graph created from the query data illustrated in FIG. 8.

FIG. 14 is a schematic diagram of the query graph generated from the query data 1 of FIG. 12. The query graph expresses criteria of the query data in the form of a graph. The criteria of the query data of FIG. 12 are:

Element-to-element hierarchical criteria of XML data
A structural element <publication> contained as a descendent element (//) of the root element
A structural element <title> contained as a child element (/) of the structural element <publication>
A structural element <author> as a child element (/) of the structural element <publication>
Text comparison criteria of XML data
Text element of the structural element <title> containing "XML"
Text element of the structural element <author> containing "Hattori"

Variables binding the elements of the XML data in the structured document database 13 are called variable nodes. In FIG. 14, each variable node is represented with a circle. A variable node that corresponds to a variable "$character string" explicitly declared in the query data is called an axis node, which is represented with a double circle in FIG. 14. A criterion for a relation between variable nodes is called a query graph predicate (hereinafter, "predicate node"). A predicate node is represented with a rhombus in FIG. 14.

Figure 15:
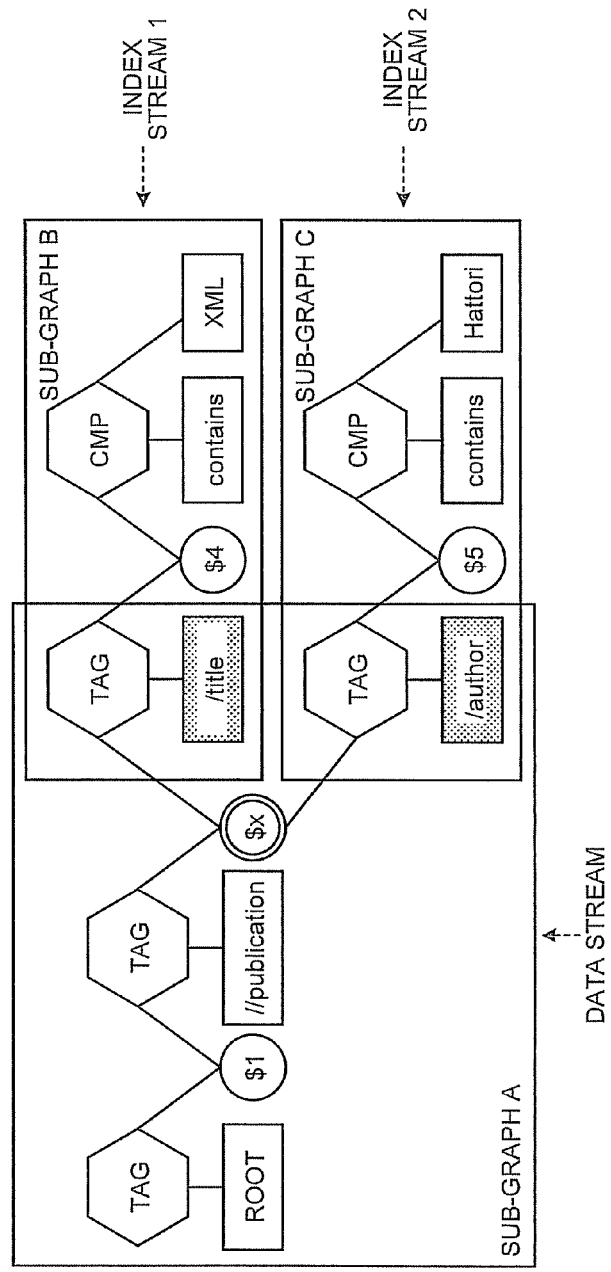
FIG. 15 is a diagram for showing an example of sub-graphs created by dividing the query graph of FIG. 14.

Next, the stream-set scanning-plan creating unit 25 scans the query graph and checks the query graph predicates, and thereby divides the query graph into sub-graphs. The graph is divided from the following aspects:
Sub-graphs having a text comparison criterion CMP
Sub-graphs composed of inter-element hierarchy criterion TAGs only FIG. 15 is a diagram for showing an example of the query graph of FIG. 14 divided into sub-graphs from the above aspects. The graph is divided into three partially overlapping sub-graphs; sub-graphs A, B, and C.
Sub-graph A is composed of inter-element hierarchy criterion TAGs only.
Sub-graphs B and C each include a text comparison criterion CMP.

Thereafter, the stream-set scanning-plan creating unit 25 assigns a stream to each of the sub-graphs obtained as a result of the above division (Step S2). For example, a data stream, an index stream 1, and an index stream 2 are assigned to the sub-graphs A to C, respectively, in this order.
Because the sub-graph A is related to the structure, the data stream is assigned to the sub-graph A.
The sub-graph B includes a comparison criterion related to the structural element <title>. By referring to the setting information of FIG. 9, the index stream 1 is assigned to the sub-graph B.
The sub-graph C includes a comparison criterion related to the structural element <author>. By referring to the setting information of FIG. 9, the index stream 2 is assigned to the sub-graph C.

In this manner, the stream-set scanning-plan creating unit 25 classifies the elements of the query graph into portions that are processed in the index streams and portions that are processed in the data stream, and assigns the streams to the sub-graphs by referring to the setting information.

Then, the stream-set scanning-plan creating unit 25 determines the order of scanning the three streams in consideration of the data sizes of the streams and the selectivity (Step S3). Various heuristics can be adopted in this determination. Among these heuristics, the simplest one is the priority according to the data size of each stream. For example, the stream-set scanning-plan creating unit 25 determines the priority of the streams in increasing order of data size. In general database technologies, the ratio of the number of elements that satisfy a search criterion when the search criterion is set to an index (stream) is called selectivity. For the selectivity, statistic data such as interval frequency distribution information is incorporated. When an index has a low selectivity, the index represents relatively a small number of records in the database table. When the index has a high selectivity, the index represents relatively a large number of records in the database table. It is assumed here that, according to the statistic information acquired beforehand, the selectivity values of the index stream 1, the index stream 2, and the data stream decrease in this order, and this order is used for the scan order determination.

Next, the stream-set scanning-plan creating unit 25 generates a scanning plan that includes scanning instructions that instruct the scanning of the streams and a control instruction that connects the scanning instructions of the streams in accordance with a logical relation between the sub-graphs, or in other words, a logical relation between the streams to which the sub-graphs are assigned (Step S4). More specifically, the stream-set scanning-plan creating unit 25 connects the scanning instructions of the streams by a control instruction such as "FILTER" when the logical relation between the streams is an AND relation. When the logical relation between the streams is an OR relation, the stream-set scanning-plan creating unit 25 connects the scanning instructions of the stream by a control instruction "OR". A scanning plan is thereby generated. The control instructions "FILTER" and "OR" makes a connection to the scanning instruction for the second stream in such a manner that the scanning of the second stream is performed in accordance with the result of scanning performed in response to the scanning instruction for the first stream.

Figure 16:
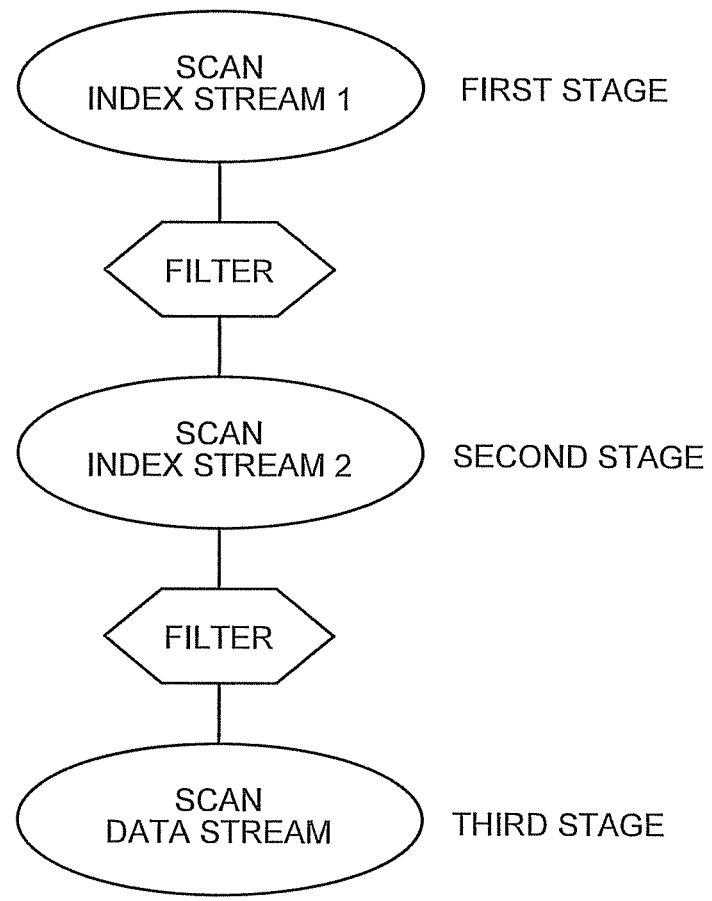
FIG. 16 is a diagram of a scanning plan created for the query data of FIG. 12 by a stream-set scanning-plan creating unit.

FIG. 16 is a diagram for showing the scanning plan generated by the stream-set scanning-plan creating unit 25 for the query data 1. This scanning plan includes a scanning instruction that instructs the scanning of the index stream 1, a scanning instruction that instructs the scanning of the index stream 2, and a scanning instruction that instructs the scanning of the data stream. Because the logical relation of those streams is an AND relation, the streams are connected by a control instruction of "FILTER". The scanning is conducted by the procedure of scanning the index stream 1 first, then the index stream 2, and finally the data stream. In the concept of stages, the scanning of the index stream 1 is the first stage, and the scanning of the index stream 2 is the second stage. In response to the scanning result of the upper stages, a control instruction "FILTER" narrows the scanning range down. In other words, according to the scanning plan, the scanning is performed in accordance with the scanning instruction for the index stream 1, and the control instruction connects this scanning instruction to the scanning instruction for the index stream 2. By not executing the scanning of the index stream 2 instructed by the connected scanning instruction due to the result of the scanning of the index stream 1, the unnecessary scanning of the index stream 2 is skipped. Furthermore, after the scanning is performed in accordance with the scanning instruction for the index stream 2, the control instruction connects this scanning instruction to the scanning instruction for the data stream. By executing the scanning of the data stream instructed by the scanning instruction due to the result of the scanning of the index stream 2, the unnecessary scanning of the data stream is skipped.

Figure 17:
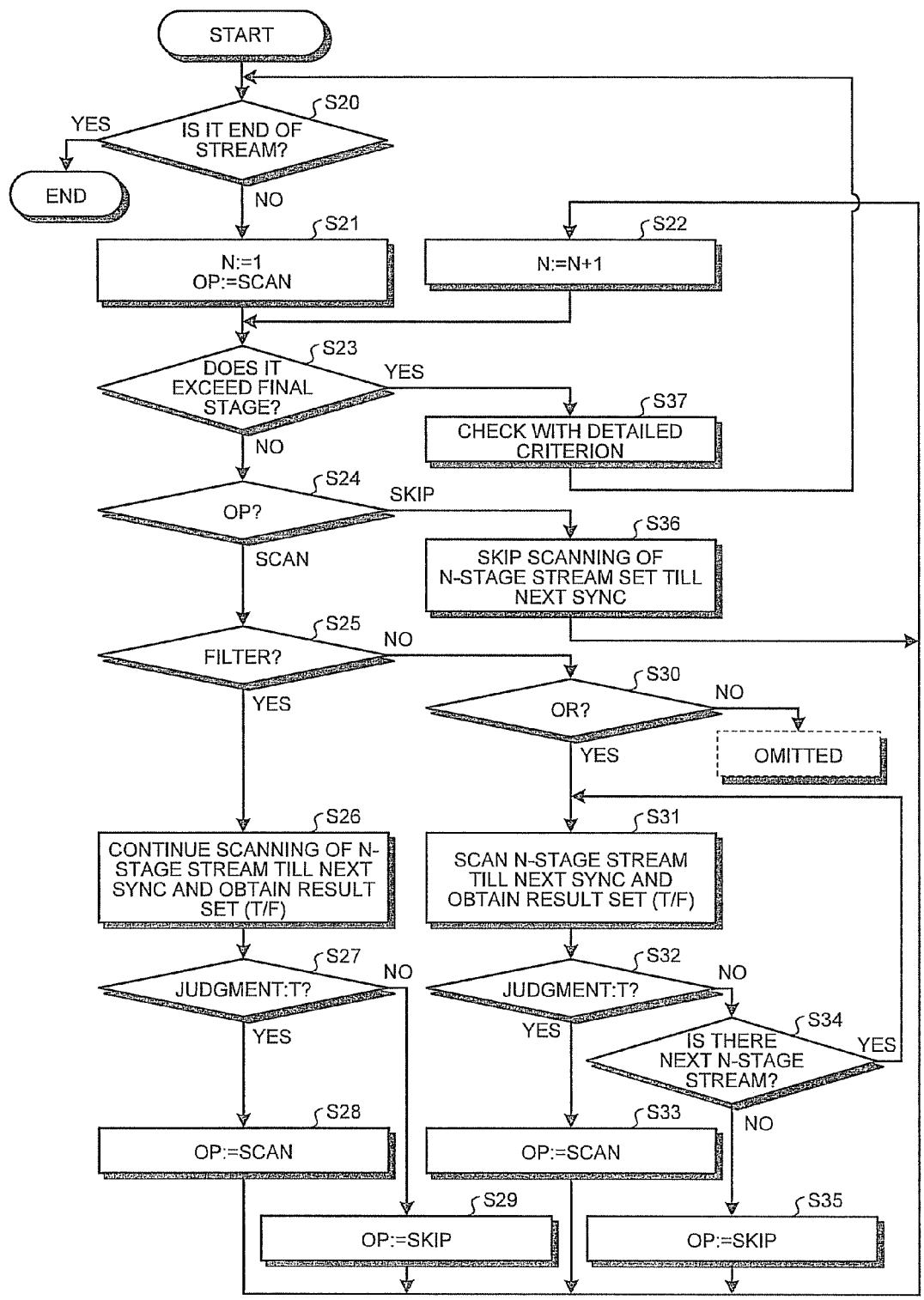
FIG. 17 is a flowchart of the procedure of a process in which the server according to the embodiment executes the scanning plan.

The procedure of the process in which the server 1 executes the scanning plan is explained below with reference to FIG. 17. The stream-set scanning-plan executing unit 26 of the server 1 repeats the following process in units of documents in accordance with the scanning plan, until it reaches the end of the streams (Yes at Step S20). First, the stream-set scanning-plan executing unit 26 defines N:=1, OP:=SCAN as parameters to execute the scanning plan (Step S21). In other words, the stream-set scanning-plan executing unit 26 determines a target scanning stage N to be the "first stage", and the type of operation to be "scan". When the target scanning stage N is not the final stage (No at Step S23) with the type of operation being "scan" ("SCAN" at Step S24) and the control instruction being "FILTER" (Yes at Step S25), the system proceeds to Step S26. At Step S26, the stream-set scanning-plan executing unit 26 performs scanning onto the target scanning stage N until the next synchronization signal SYNC appears to determine whether there is any expression that matches the search criteria in the scanning range. More specifically, the stream-set scanning-plan executing unit 26 performs scanning the scanning range of a document that is determined as a data block between a synchronization signal and the next synchronization signal. When there is more than one data block, not all the data blocks but only part of the data blocks may be subjected to the scanning, depending on the search criteria.

Next, when the scan result obtained at Step S26 is positive (Yes at Step S27), the stream-set scanning-plan executing unit 26 determines the type of operation to be "scan" (Step S28), and the system proceeds to Step S22. On the other hand, when the scan result of Step S26 is negative (No at Step S27), the stream-set scanning-plan executing unit 26 selects "skip" for the type of operation (Step S29), and the system proceeds to Step S22. At Step S22, the stream-set scanning-plan executing unit 26 sets the parameters to N:N+1 for the execution of the scanning plan (Step S22). In other words, the stream-set scanning-plan executing unit 26 increments the target scanning stage N by 1. Thereafter, the stream-set scanning-plan executing unit 26 performs the process of Step S23 and after.

When the control instruction is not "FILTER" (No at Step S25), but is "OR" (Yes at Step S30), the system proceeds to Step S31. At Step S31, the stream-set scanning-plan executing unit 26 performs scanning on the stream of the target scanning stage N until the next synchronization signal SYNC is issued, and determines whether there is any expression that matches the search criteria in the scanning range. When the scan result obtained at Step S32 is positive (Yes at Step S32), the stream-set scanning-plan executing unit 26 selects "scan" for the type of operation (Step S33), and the system proceeds to Step S22. On the other hand, when the scan result of Step S32 is negative (No at Step S32), the stream-set scanning-plan executing unit 26 determines whether there is a stream of a stage following the current target scanning stage N (Step S34). When the determination result is negative, the stream-set scanning-plan executing unit 26 sets "skip" for the type of operation (Step S35), and the system returns to Step S22. When the determination result of Step S34 is positive, the system returns to Step S31.

When the type of operation is not "scan" but "skip" ("SKIP" at Step S24), the stream-set scanning-plan executing unit 26 skips the scanning of the stream of the target scanning stage N until the next synchronization signal SYNC is issued (Step S36), and the system proceeds to Step S22. When the target scanning stage exceeds the final stage (Yes at Step S23), the stream-set scanning-plan executing unit 26 checks the result data based on the detailed criteria (Step S37) to generate the final result data, and the system proceeds to Step S20. In this manner, the stream-set scanning-plan executing unit 26 executes the scanning plan, and when it reaches the end of the streams (Yes at Step S20), it terminates the execution.

Figure 18:
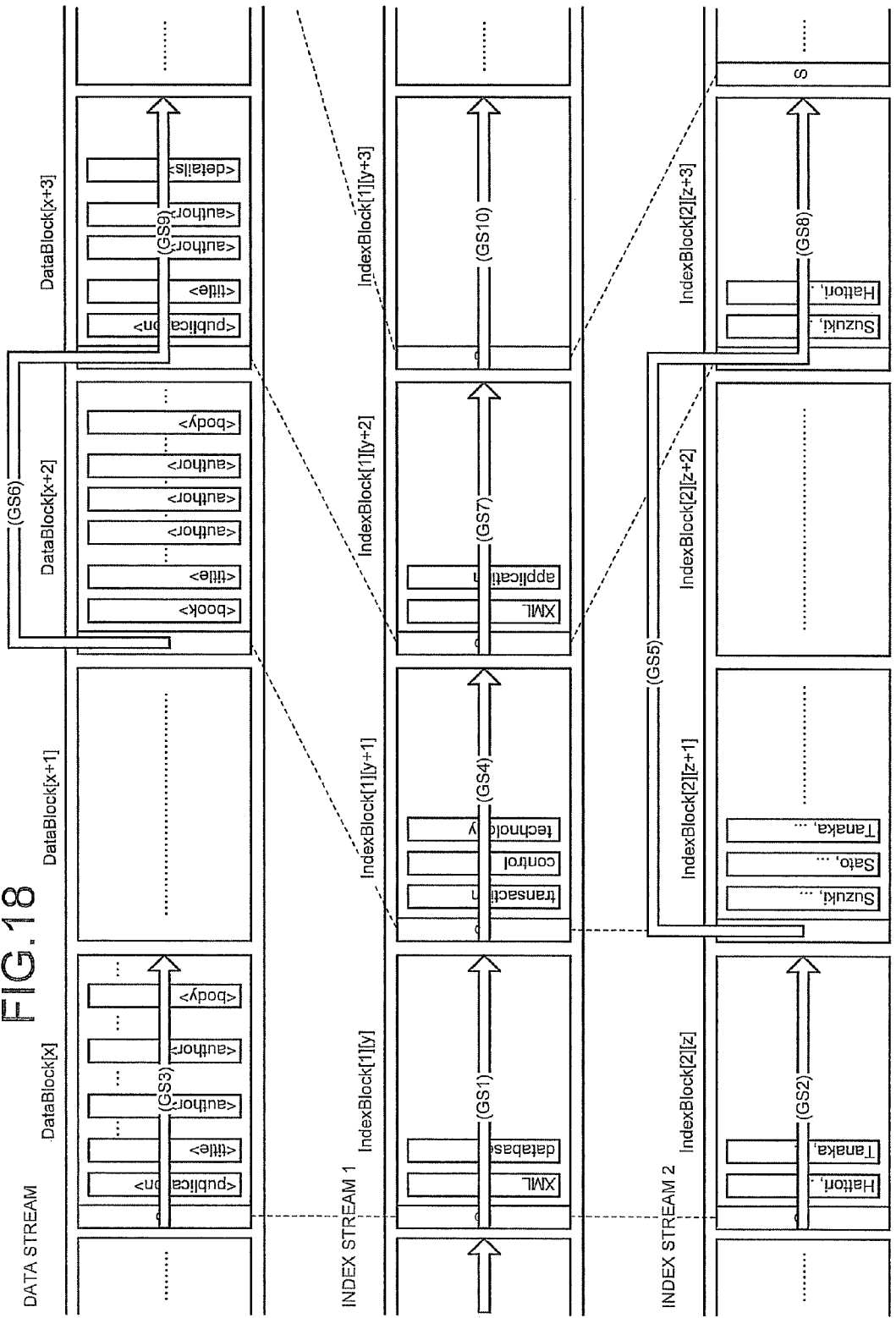
FIG. 18 is a diagram of an image of the process in which the server executes the scanning plan of FIG. 16.

An example of the process in which the server 1 executes the scanning is given below. FIG. 18 is a conceptual diagram of the process in which the server 1 executes the scanning plan of FIG. 16. In this example, the stream-set scanning-plan executing unit 26 scans all the blocks included in the index stream 1, IndexBlock[1] [i] (i=0, 1, 2, . . . ).

(GS1) First, the stream-set scanning-plan executing unit 26 scans IndexBlock[1] [y] of the index stream 1 in the first target scanning stage, determines whether there is a text element "XML" as a search criterion in the scanning range, and judges here that the text element is present (Steps S21, S23 to S28).

(GS2) Next, the stream-set scanning-plan executing unit 26 scans IndexBlock[2] [z] of the index stream 2 in the second target scanning stage, determines whether there is a text element "Hattori" as a search criterion in the scanning range, and judges here that the text element is present (Steps S22, S23 to S28).

(GS3) Next, the stream-set scanning-plan executing unit 26 scans DataBlock[x] of the data stream in the third target scanning stage, and obtains the result data, in other words, the data of the document 1 (Steps S22, S23 to S28).

Thereafter, the detailed criterion checking unit 27 checks the result data obtained at (GS3) based on the detailed criteria, generates the final result data, and stores it in the RAM 103 (Steps S22, S23, S37).

(GS4) Then, the stream-set scanning-plan executing unit 26 returns to the scanning of the index stream 1 in the first target scanning stage, and when scanning the next bock IndexBlock[1] [y+1], the stream-set scanning-plan executing unit 26 judges that there is no text element "XML" (Steps S20 to S21, S23 to S27, S29).

(GS5) Then, the stream-set scanning-plan executing unit 26 skips the scanning of the data blocks IndexBlock[2] [z+1] and IndexBlock[2] [z+2] of the index stream 2 in the second target scanning stage, which is the next target stage (Steps S22 to S24, S36)

(GS6) Similarly, the stream-set scanning-plan executing unit 26 skips the scanning of the data block DataBlock[x+2] of the data stream in the third target scanning stage, which is the next target stage (Steps S22 to S24, S36).

(GS7) The stream-set scanning-plan executing unit 26 returns to the scanning of the index stream 1 in the first target scanning stage, scans the next block IndexBlock[1] [y+2], and judges that the text element "XML" is present (Steps S20 to S21, S23 to S28).

(GS8) The stream-set scanning-plan executing unit 26 scans IndexBlock[2] [z+3] of the index stream 2 in the second target scanning stage, and judges that the text element "Hattori" is present (Steps S22, S23 to S28).

(GS9) Next, the stream-set scanning-plan executing unit 26 scans DataBlock[x+3] of the data stream in the third target scanning stage, and obtains the result data, or in other words, the data of the document 3 (Steps S22, S23 to S28).

Thereafter, the detailed criterion checking unit 27 checks the result data obtained at (GS9) based on the detailed criterion, generates the final result data, and stores it in the RAM 103 (Steps S22, S23, S37).

(GS10) The stream-set scanning-plan executing unit 26 returns to the scanning of the index stream 1 in the first target scanning stage, and continues the above process.

In accordance with the scanning plan of FIG. 16, the stream-set scanning-plan executing unit 26 conducts the scanning according to the scanning instruction for the index stream 1, and skips unnecessary scanning on the index stream 2 by not executing, in response to the result of the scanning of the index stream 1, the scanning that is instructed by the scanning instruction for the index stream 2 connected to the scanning instruction for the index stream 1 by the control instruction. Furthermore, the stream-set scanning-plan executing unit 26 skips unnecessary scanning of the data stream, by not executing, in response to the result of the scanning performed in accordance with the scanning instruction for the index stream 2, the scanning that is instructed by the scanning instruction for the data stream connected to the scanning instruction for the index stream 2 by the control instruction.

Figures 19, 20:
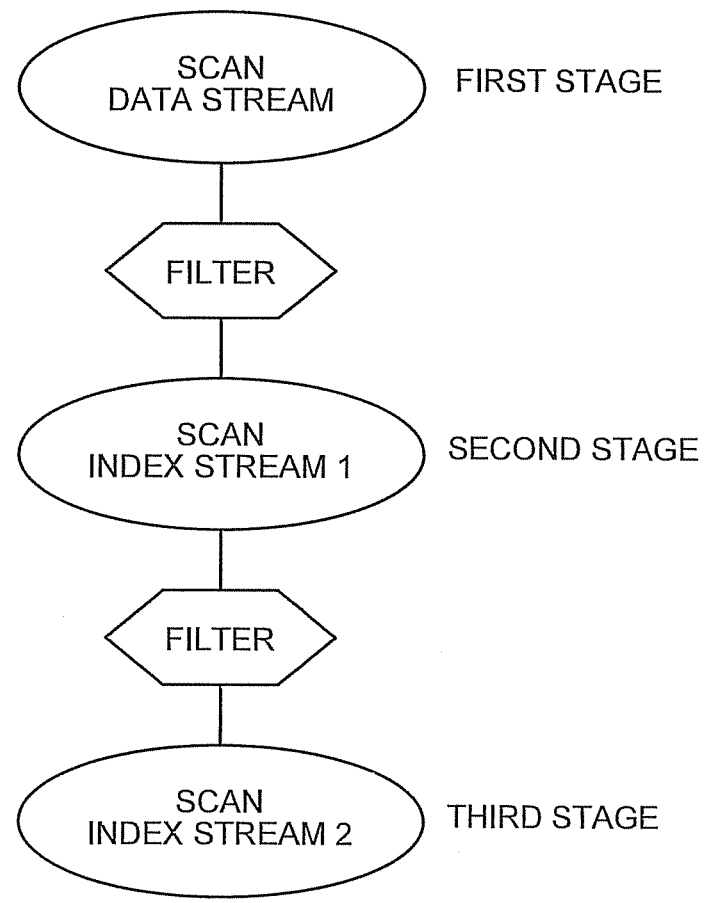
FIG. 19 is a diagram for showing another example of the query data according to the embodiment.
FIG. 20 is a diagram for showing a scanning plan created for the query data of FIG. 19 by the stream-set scanning-plan creating unit.

The creation and execution of the scanning plan based on another example query data is now explained. FIG. 19 is a diagram for showing another example of the query data. Query data 2 makes the following search request. The hierarchical tree of the structured document database "ROOT" includes a structural element <book>, which includes a structural element <title>. A text element "XML" appears in the structural element <title>. The structural element <book> also includes a structural element <author>, in which a text element "Hattori" appears. The list of <book> of the structured document data is to be returned.

FIG. 20 is a diagram for showing a scanning plan generated by the stream-set scanning-plan creating unit 25 for the query data 2 of FIG. 19. This scanning plan includes scanning instructions for the data stream, for the index stream 1, and for the index stream 2. These instructions are connected by a control instruction such as "FILTER". In the scanning procedure, the data stream is first scanned, then the index stream 1 is scanned, and finally the index stream 2 is scanned. This means that, according to this scanning plan, the scanning of the index stream 1 that becomes unnecessary to perform as a result of the scanning of the data stream is skipped, and the scanning of the index stream 2 that becomes unnecessary to perform as a result of the scanning of the index stream 1 is skipped.

Figure 21:
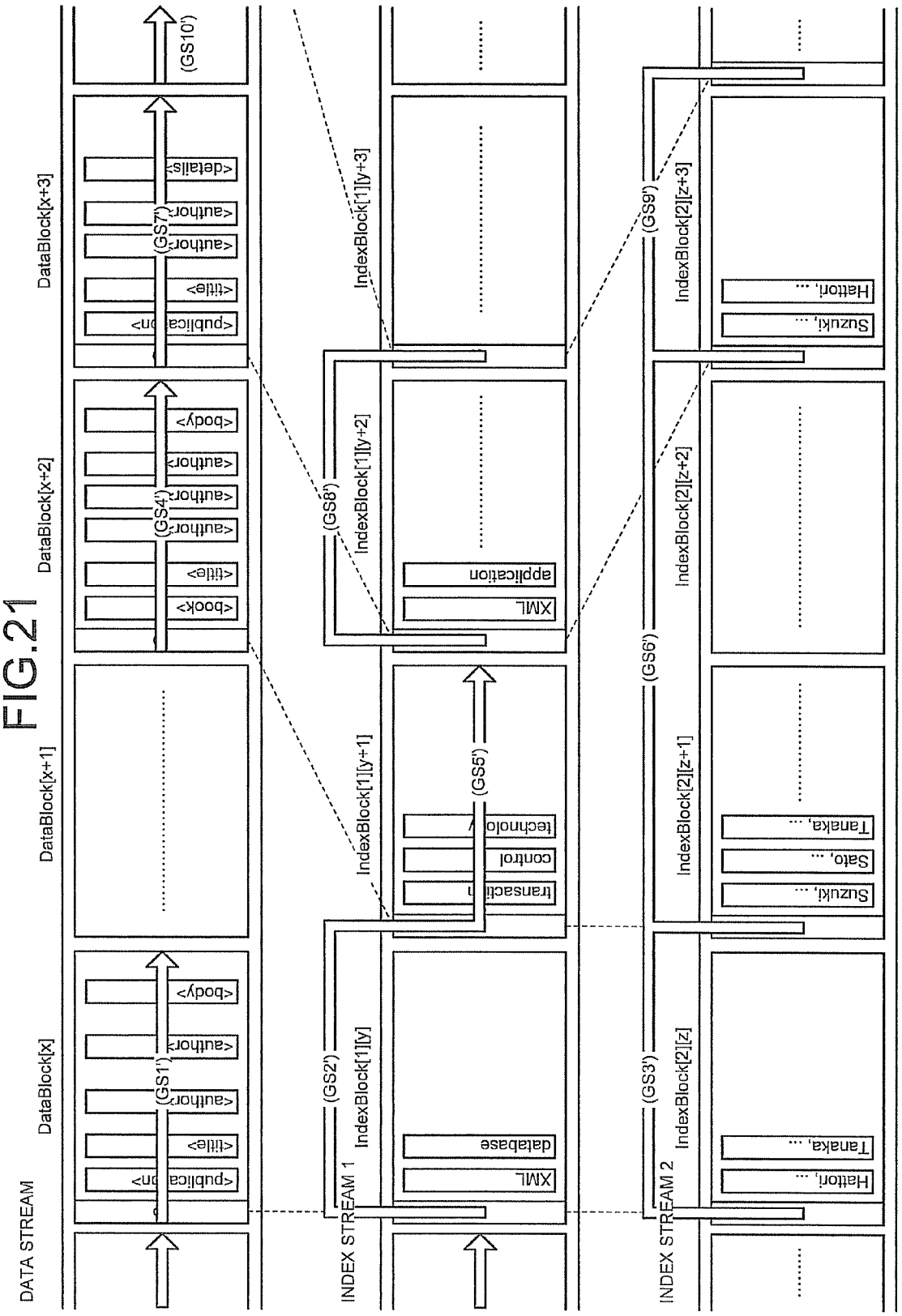
FIG. 21 is a diagram of an image of a process in which the server executes the scanning plan of FIG. 20.

The overview of the process in which the server 1 executes the scanning plan of FIG. 20 is given with reference to FIG. 21. In this example, the stream-set scanning-plan executing unit 26 scans all the blocks DataBlock[i] (i=0, 1, 2, . . . ) included in the data stream.

(GS1') First, the stream-set scanning-plan executing unit 26 scans IndexBlock[x] of the data stream in the first target scanning stage, determines whether the hierarchical tree "ROOT" includes a structural element <book> as a search criteria in the scan region, and judges here that there is no such an element (Steps S21, S23 to S27, S29). Because the structural element <book> is the first element among the elements of the document, scanning of the rest of the blocks in this document, which is DataBlock[x+1], is unnecessary.

(GS2') Then, the stream-set scanning-plan executing unit 26 skips the scanning of IndexBlock[1] [y] of the index stream 1 in the second target scanning stage (Steps S22 to S24, S36).

(GS3') In the same manner, the stream-set scanning-plan executing unit 26 skips the scanning of the data block IndexBlock[2] [z] of the index stream 2 in the third target scanning stage (Steps S22 to S24, S36).

(GS4') Thereafter, the stream-set scanning-plan executing unit 26 returns the scanning of the data stream in the first target scanning stage, scans the next block DataBlock[x+2], and judges that the hierarchical tree "ROOT" includes a structural element <book> (Steps S20 to S21, S23 to S28).

(GS5') Next, the stream-set scanning-plan executing unit 26 scans the IndexBlock[1] [y+1] of the index stream 1 that is the second target scanning stage, determines whether the text element "XML" is included as a search criterion in the scanning range, and judges here that the element is not included (Steps S22 to S27, S29).

(GS6') Then, the stream-set scanning-plan executing unit 26 skips the scanning of the data blocks IndexBlock[2] [z+1] and IndexBlock[2] [z+2] of the index stream 2 in the third target scanning stage (Steps S22 to S24, S36).

(GS7') The stream-set scanning-plan executing unit 26 returns to the scanning of the data stream in the first target scanning stage, scans the next block DataBlock[x+3], and judges that the hierarchical tree "ROOT" does not include the structural element <book> (Steps S21, S23 to S27, S29).

(GS8') Then, the stream-set scanning-plan executing unit 26 skips the scanning of IndexBlock[1] [y+2] of the index stream 1 in the second target scanning stage (Steps S22 to S24, S36).

(GS9') In the same manner, the stream-set scanning-plan executing unit 26 skips the scanning of the data block IndexBlock[2] [z+3] of the index stream 2 in the third target scanning stage (Steps S22 to S24, S36).

(GS10') Thereafter, the stream-set scanning-plan executing unit 26 returns to the scanning of the data stream in the first target scanning stage, and continues the above process.

In this manner, the stream-set scanning-plan executing unit 26 skips unnecessary scanning of the index stream 1 in the scanning plan of FIG. 20 by not executing, in response to the result of the scanning executed in accordance with the scanning instruction for the data stream, the scanning instructed by the scanning instruction for the index stream 1, which is connected to the scanning instruction for the data stream by the control instruction. The stream-set scanning-plan executing unit 26 also skips unnecessary scanning of the index stream 2 by not executing, in response to the result of the scanning conducted in accordance with the scanning instruction for the index stream 1, the scanning instructed by the scanning instruction for the index stream 2, which is connected to the scanning instruction for the index stream 1 by the control instruction.

Figures 22, 23:
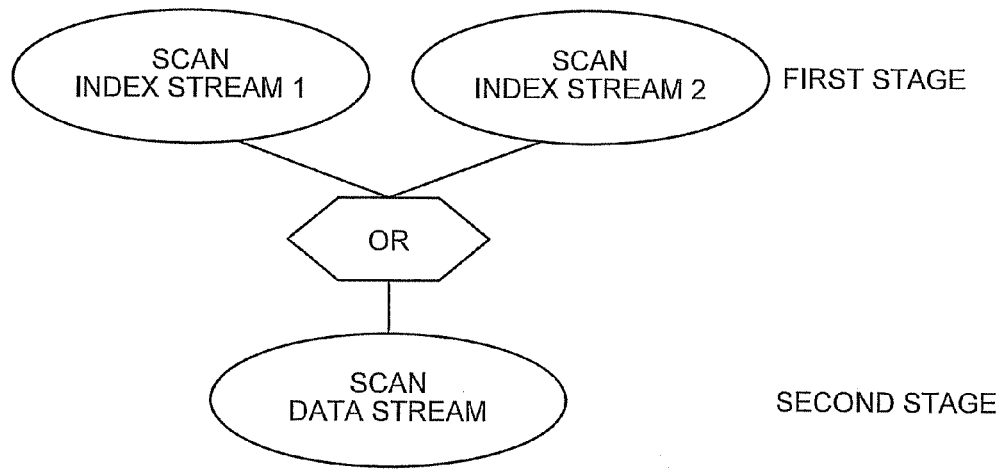
FIG. 22 is a diagram for showing still another example of the query data according to the embodiment.
FIG. 23 is a diagram of a scanning plan created for the query data 3 of FIG. 22 by the stream-set scanning-plan creating unit 25.

The creation and execution of a scanning plan based on still another example of the query data is explained below. FIG. 22 is a diagram of such an example of the query data. This drawing shows query data 3 that makes the following search request. The hierarchical tree of the structured document database "ROOT" includes a structural element <publication>, which includes a structural element <title>. A text element "XML" appears in this structural element <title>. Otherwise, this structural element <publication> includes the structural element <author>, and the text element "Hattori" appears in the structural element <author>. A list of <publication> of such structured document data is to be returned.

FIG. 23 is a diagram of a scanning plan generated by the stream-set scanning-plan creating unit 25 for the query data 3 of FIG. 22. This scanning plan includes scanning instructions for the index stream 1, for the index stream 2, and for the data stream. The scanning instructions for the index stream 1 and for the index stream 2 are connected to each other by a control instruction "OR". In the scanning procedure, the scanning of the index streams 1 and 2 is performed, and then the scanning of the data stream is performed. The control instruction "OR" narrows the scanning range down in view of the scanning result of the upper stages. This instruction is differentiated from "FILTER" in that the scanning result of the upper stages can be omitted. In other words, according to this scanning plan, the scanning of the index stream 2 may be skipped in view of the scanning result of the index stream 1.

The overview of the process in which the server 1 executes the scanning plan of FIG. 23 is given with reference to FIG. 24. In this example, the stream-set scanning-plan executing unit 26 scans all the blocks IndexBlock[1] [i] (i=0, 1, 2, . . . ) included in the index stream 1.

(GS1") First, the stream-set scanning-plan executing unit 26 scans IndexBlock[1] [y] of the index stream 1 in the first target scanning stage, determines whether a text element "XML" is included in the scanning range as a search criterion, and judges here that it is included (Steps S21, S23 to S28).

(GS2") Then, the stream-set scanning-plan executing unit 26 skips the scanning of the data block IndexBlock[2] [z] of the index stream 2 in the second scan target (Steps S22 to S24, S36).

(GS3") Next, the stream-set scanning-plan executing unit 26 scans DataBlock[x] of the data stream in the third target scanning stage, and acquires the result data, which is the data of the document 1 (Steps S22, S23 to S28).

Thereafter, the detailed criterion checking unit 27 checks the result data acquired at (GS3") based on the detailed criteria, generates the final result data, and stores it in the RAM 103 (Steps S22, S23, S37).

(GS4") The stream-set scanning-plan executing unit 26 returns to the scanning of the index stream 1 in the first target scanning stage, scans the next block IndexBlock[1] [y+1], and judges that the text element "XML" is not included (Steps S20 to S21, S23 to S27, S29).

(GS5") Thereafter, the stream-set scanning-plan executing unit 26 scans IndexBlock[2] [z+1] and IndexBlock[2] [z+2] of the index stream 2 in the second target scanning stage, determines whether there is the text element "Hattori" in the scanning range as a search criterion, and judges here that there is no such an element (Steps S20 to S21, S23 to S27, S29).

(GS6") Then, the stream-set scanning-plan executing unit 26 skips the scanning of the data block DataBlock[x+2] of the data stream in the third scan target (Steps S22 to S24, S36).

(GS7") The stream-set scanning-plan executing unit 26 returns to the scanning of the index stream 1 in the first target scanning stage, scans the next block IndexBlock[1] [y+2], and judges that the text element "XML" is included (Steps S20 to S21, S23 to S28).

(GS8") Then, the stream-set scanning-plan executing unit 26 skips the scanning of IndexBlock[2] [z+3] of the index stream 2 in the second target scanning stage (Steps S22 to S24, S36).

(GS9") Next, the stream-set scanning-plan executing unit 26 scans DataBlock[x+3] of the data stream in the third target scanning stage, and acquires the result data, which is the data of the document 3 (Steps S22, S23 to S28).

Then, the detailed criterion checking unit 27 checks the result data acquired at (GS9") based on the detailed criteria, generates the final result data, and stores it in the RAM 103 (Steps S22, S23, S37).

(GS10") Thereafter, the stream-set scanning-plan executing unit 26 returns the scanning of the index stream 1 in the first target scanning stage, and continues the above process.

In the scanning plan of FIG. 23, the stream-set scanning-plan executing unit 26 skips unnecessary scanning of the index stream 2 by not executing, in view of the result of the scanning conducted in accordance with the scanning instruction for the index stream 1, the scanning instructed by the scanning instruction for the index stream 2, which is connected to the scanning instruction for the index stream 1 by the control instruction. Furthermore, the stream-set scanning-plan executing unit 26 skips unnecessary scanning of the data stream by not executing, in view of the result of scanning conducted in accordance with the scanning instructions for the index stream 1 and for the index stream 2, the scanning instructed by the scanning instruction for the data stream, which is connected to the scanning instructions for the index streams by the control instruction.

According to the embodiments of the present invention, the scanning ranges of the index and the document body are narrowed down at a time by alternatively scanning the data stream, which corresponds to the main body of the structured document data, and the index streams, which serve as an index for each document. In this manner, unnecessary scanning can be skipped. Hence, the number of accesses to the structured document database is reduced, and the scanning can be effectively performed. Thus, the responsivity of the search can be improved.

The present invention is not limited to embodiments described above, but modifications may be embodied by modifying the structural elements in practice without departing from the scope of the invention-in practice. Various inventions can be provided by suitably combining the structural elements disclosed in the embodiments. For example, some of the structural elements may be omitted from the embodiments. The structural elements of different embodiments may be suitably combined. The following modifications may also be made.

According to the above embodiments, a method of generating the data stream and the index streams is described by use of the structure guide data, but the method is not limited thereto.

Furthermore, two index streams are adopted according to the above embodiments, but the number of index streams is not limited thereto.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A structured document searching apparatus that stores a plurality of structured document data each including a plurality of elements that are hierarchized, the apparatus comprising:

a first store unit that stores a data stream in which the elements included in each of the structured document data are arranged in an order of a result of a syntactic analysis;

a second store unit that stores at least one index stream in which the elements that are included in the structured document data and serve as an index when searching the structured document data are arranged in the order of the result of the syntactic analysis;

a creating unit that creates a scanning plan that instructs a scanning of the data stream and the index stream based on a search criterion for searching through the structured document data; and an executing unit that executes a scanning on at least one of the data stream and the index stream in accordance with the scanning plan, wherein the creating unit creates the scanning plan, for each structured document data, that instructs a scanning of a first stream among streams including the data stream and the index stream, and instructs a scanning of a second stream in accordance with a result of the scanning of the first stream, based on the search criterion;

the data stream includes a plurality of arranged data blocks each having a fixed length, the first store unit embeds, for each the structured document data, a synchronization signal in a leading data block of each of the arranged data blocks, and stores the data stream; and the executing unit executes the scanning of the first stream in accordance with the scanning plan in each structured document data and skipping the scanning of the data blocks between an appearance of a first synchronization signal and an appearance of a second synchronization signal in the second stream as the data stream according to the result of the scanning of the leading data block of the arranged data blocks, thereby executing the scanning of the data stream with the plurality of arranged data blocks between appearance of the synchronization signal and appearance of the second synchronization signal embedded in each structured document data.

2. The apparatus according to claim 1, further comprising an acquiring unit that acquires query data as a search request designating the search criterion, from a client device, wherein the creating unit creates the scanning plan by use of the query data.

3. The apparatus according to claim 2, wherein the creating unit includes a graph creating unit that performs a syntactic analysis on the query data and creates a query graph representing the search criterion in a tree structure;

a dividing unit that divides the query graph into sub-graphs;

an assigning unit that assigns at least one stream of the streams including the data stream and the index stream to each of the sub-graphs; and a plan creating unit that creates a scanning plan including scan instructions that instruct scanning of the streams assigned to the sub-graphs and a control instruction, the control instruction determining the procedure of the scan instructions in accordance with a logical relation of the sub-graphs, and connecting a scan instruction for the second stream to a scan instruction for the first stream in such a manner that the scanning of the second stream is executed according to the result of the scanning performed in accordance with the scan instruction for the first stream.

4. The apparatus according to claim 3, wherein the assigning unit assigns at least one of the streams to each of the sub-graphs, based on at least one of a data size of each of the streams and selectivity representing a ratio of the number of elements that satisfy the search criterion when the search criterion is set to the streams.

5. The apparatus according to claim 3, wherein the executing unit executes a scanning in accordance with the scan instruction included in the scanning plan for the first stream, and then skips the scanning of the second stream according to the result of the scanning of the first stream by not executing the scanning instructed by the scan instruction for the second stream, the scan instruction being connected by the control instruction to the scan instruction for the first stream.

6. The apparatus according to claim 1, further comprising a first generating unit that performs the syntactic analysis onto the structured document data, and generates the data stream in which the elements included in the structured document data are arranged in the order of the result of the syntactic analysis, by use of structure guide data summarizing a hierarchical structure of the structured document data.

7. The apparatus according to claim 1, further comprising a second generating unit that performs the syntactic analysis onto the structured document data, and generates an index stream in which the elements included in the structured document data and designated by the setting information are arranged in the order of the result of the syntactic analysis, by use of structure guide data and setting information designating elements adopted for an index from among the elements.

8. The apparatus according to claim 1, further comprising an output unit that outputs a search result in response to the search request, based on a result of execution.

9. The apparatus according to claim 1, wherein
the first store unit embeds, for each the structured document data, a synchronization signal in a head of the leading data block, and stores the data stream.

10. The apparatus according to claim 1, wherein the first store unit embeds, for each the structured document data, a synchronization signal in a head of the leading data block, and stores the index stream.

11. A structured document searching method executed by a structured document searching apparatus that stores a plurality of structured document data each including a plurality of elements that are hierarchized, the method comprising;
storing a data stream in which the elements included in each of the structured document data are arranged in an order of a result of a syntactic analysis;
storing in at least one index stream in which the elements that are included in the structured document data and serve as an index when searching the structured document data are arranged in the order of the result of the syntactic analysis;
creating a scanning plan that instructs scanning of the data stream and the index stream based on a search criterion for searching through the structured document data; and
executing a scanning of at least one of the data stream and the index stream in accordance with the scanning plan, wherein
the creating the scanning plan includes creating the scanning plan, for each structured document data, that instructs a scanning of a first stream among streams including the data stream and the index stream, and that instructs a scanning of a second stream in accordance with a result of the scanning of the first stream, based on the search criterion;
the data stream includes a plurality of arranged data blocks each having a fixed length;
the storing the data stream includes embedding, for each the structured document data, a synchronization signal in a leading data block of each of the arranged data blocks, and storing the data stream; and
the executing the scanning includes executing the scanning of the first stream in accordance with the scanning plan in each structured document data and skipping the scanning of the data blocks between an appearance of a first synchronization signal and an appearance of a second synchronization signal in the second stream as the data stream according to the result of the scanning of the leading data block of the arranged data blocks, thereby executing the scanning of the data stream with the plurality of arranged data blocks between appearance of the first synchronization signal and appearance of the second synchronization signal embedded in each structured document data.

12. A computer program product having a computer readable recording medium including programmed instructions executable on a computer having a structured document searching apparatus that stores a plurality of structured document data each including a plurality of elements that are hierarchized, wherein the instructions, when executed by the computer, cause the computer to perform:
storing a data stream in which the elements included in each of the structured document data are arranged in an order of a result of a syntactic analysis;
storing at least one index stream in which the elements that are included in the structured document data and serve as an index when searching the structured document data are arranged in the order of the result of the syntactic analysis;
creating a scanning plan that instructs scanning of the data stream and the index stream based on a search criterion for searching through the structured document data; and
executing a scanning of at least one of the data stream and the index stream in accordance with the scanning plan, wherein
the creating the scanning plan includes creating the scanning plan, for each structured document data, that instructs a scanning of a first stream among streams including the data stream and the index stream, and that instructs the scanning of a second stream in accordance with a result of the scanning of the first stream, based on the search criterion;
the data stream includes a plurality of arranged data blocks each having a fixed length;
the storing the data stream includes embedding, for each of the structured document data, a synchronization signal in a leading data block of each of the arranged data blocks, and storing the data stream; and
the executing the scanning includes executing the scanning of the first stream in accordance with the scanning plan in each structured document data and skipping the scanning of the data blocks between an appearance of a first synchronization signal and an appearance of a second synchronization signal in the second stream as the data stream according to the result of the scanning of the leading data block of the arranged data blocks, thereby executing the scanning of the data stream with the plurality of arranged data blocks between appearance of the first synchronization signal and appearance of the second synchronization signal embedded in each structured document data.

* * * * *